(12) United States Patent
Tolhurst et al.

(10) Patent No.: US 11,933,250 B2
(45) Date of Patent: Mar. 19, 2024

(54) GASEOUS FUEL-AIR MIXER WITH HIGHER MIXTURE UNIFORMITY

(71) Applicant: CUMMINS INC., Columbus, IN (US)

(72) Inventors: George Martin Tolhurst, Rugby (GB); Joshua Bradley Bettis, Columbus, IN (US); Alan C. Anderson, Columbus, IN (US); Jeremy Aaron Lackey, Scottsburg, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/017,761

(22) PCT Filed: Jul. 16, 2021

(86) PCT No.: PCT/US2021/041990
§ 371 (c)(1),
(2) Date: Jan. 24, 2023

(87) PCT Pub. No.: WO2022/026214
PCT Pub. Date: Feb. 3, 2022

(65) Prior Publication Data
US 2023/0313760 A1    Oct. 5, 2023

Related U.S. Application Data

(60) Provisional application No. 63/057,414, filed on Jul. 28, 2020.

(51) Int. Cl.
*F02M 21/04* (2006.01)
*F02M 29/04* (2006.01)
(52) U.S. Cl.
CPC ............ *F02M 21/04* (2013.01); *F02M 29/04* (2013.01)

(58) Field of Classification Search
CPC ............................. F02M 21/04; F02M 29/04
(Continued)

(56) References Cited

U.S. PATENT DOCUMENTS

| 4,991,561 A | 2/1991 | Gerassimov et al. |
| 5,408,978 A | 4/1995 | Davis |

(Continued)

FOREIGN PATENT DOCUMENTS

| CN | 103114944 | 5/2013 |
| CN | 105612386 | 5/2016 |

(Continued)

OTHER PUBLICATIONS

CN106438115A (Li-Shui et al.) (Feb. 22, 2017) (Year: 2017).*
(Continued)

*Primary Examiner* — Mahmoud Gimie
(74) *Attorney, Agent, or Firm* — Foley & Lardner LLP

(57) ABSTRACT

A gaseous fuel-air mixer includes an outer shell, an inner shell, and a fuel chamber rib. The outer shell includes an air intake and a fuel intake. The air intake is configured to receive air. The air intake has an air outlet. The fuel intake has a fuel inlet that is configured to receive fuel. The inner shell includes an inner shell intake that is configured to separately receive the air from the air outlet and the fuel from the fuel intake and to provide a gaseous fuel-air mixture. The inner shell cooperates with the outer shell to define a fuel intake collecting chamber that is configured to receive the fuel from the fuel inlet and a fuel intake concentrating chamber that is configured to receive the fuel from the fuel intake collecting chamber and provide the fuel to the inner shell intake.

18 Claims, 14 Drawing Sheets

(58) Field of Classification Search
USPC .................................................. 123/527–529
See application file for complete search history.

(56) References Cited

U.S. PATENT DOCUMENTS

| | | | |
|---|---|---|---|
| 5,527,367 | A | 6/1996 | Harada |
| 5,908,475 | A | 6/1999 | Morris et al. |
| 7,100,459 | B2 | 9/2006 | Gehner et al. |
| 8,757,133 | B2 | 6/2014 | Czapka et al. |
| 8,950,383 | B2 | 2/2015 | Sperry |
| 9,032,937 | B2 | 5/2015 | Luft et al. |
| 10,113,512 | B2 | 10/2018 | Bowing et al. |
| 10,161,627 | B2 | 12/2018 | Doura et al. |
| 10,364,774 | B2 | 7/2019 | Dodman et al. |
| 2014/0209075 | A1 | 7/2014 | Luft et al. |
| 2015/0354809 | A1 | 12/2015 | Doura et al. |
| 2016/0161114 | A1 | 6/2016 | Ranalli et al. |
| 2018/0135563 | A1 | 5/2018 | Dodman et al. |

FOREIGN PATENT DOCUMENTS

| | | | | |
|---|---|---|---|---|
| CN | 106438115 A | * | 2/2017 | ............. F02M 21/04 |
| CN | 108412641 A | * | 8/2018 | |
| DE | 19729047 | | 9/1998 | |
| DE | 10349344 | | 10/2003 | |
| DE | 10 2007 022 008 | | 5/2007 | |
| EP | 0 890 787 | | 1/1999 | |
| EP | 1 482 245 | | 12/2004 | |
| EP | 2 278 224 | | 1/2011 | |
| EP | 2 597 369 | | 5/2013 | |
| EP | 2 843 308 | | 3/2015 | |
| IT | 20130189 | | 1/2015 | |
| WO | WO-2015/001438 | | 1/2015 | |

OTHER PUBLICATIONS https://mart.cummins.com/imagelibrary/data/assetfiles/0058538.pdf.
https://mart.cummins.com/imagelibrary/data/assetfiles/0061756.pdf.
International Search Report and Written Opinion for PCT Application No. PCT/US2021/041990, dated Oct. 20, 2021.

* cited by examiner

GASEOUS FUEL-AIR MIXER WITH HIGHER MIXTURE UNIFORMITY

CROSS-REFERENCE TO RELATED PATENT APPLICATION

The present application is the U.S. National Phase of PCT Application No. PCT/US2021/041990, filed Jul. 16, 2021, which claims priority to U.S. Provisional Patent Application No. 63/057,414, entitled "GASEOUS FUEL-AIR MIXER WITH HIGHER MIXTURE UNIFORMITY" and filed Jul. 28, 2020, the contents of which are incorporated herein by reference.

TECHNICAL FIELD

The present application relates generally to gaseous fuel-air mixers for internal combustion engines.

BACKGROUND

For an internal combustion engine with a turbocharger, fuel is mixed with air at an introduction location upstream of an inlet of a compressor of the turbocharger. This introduction may cause a pressure drop of the fuel. Different fuels have different pressure drops between a supply pressure (e.g., upstream of the introduction location, etc.) and a pressure of the fuel when mixed with the air upstream of the inlet of the compressor. When this pressure drop is above a threshold (e.g., when the supply pressure is significantly greater than the pressure of the fuel when mixed with the air upstream of the inlet of the compressor, etc.), it may not be possible to desirably combust the fuel using the internal combustion engine (e.g., due to de-rating, etc.). Additionally or alternatively, introduction of fuel into air may not cause desirable mixing of the fuel and the air. As a result, pockets of fuel may be dispersed within the air stream. Due to the different density of the fuel compared to the air, these pockets of fuel can undesirably impact downstream components, such as a compressor wheel (e.g., due to fatigue).

For an engine to achieve equal power output when using a fuel with a relatively low calorific value compared to when using a fuel with a higher calorific value, a higher volume of the fuel with the relatively low calorific value must be consumed than would be consumed of the fuel with the higher calorific value. In order to ensure desirable combustion of the fuel using a system with an internal combustion engine and account for the pressure drop of the system, a supply pressure of the fuel may be increased. In some situations, a supply pressure of fuel cannot be desirably increased (e.g., due to cost, due to feasibility, etc.), thereby making desirable combustion of the fuel difficult or impossible.

SUMMARY

In one set of embodiments, a gaseous fuel-air mixer includes an outer shell, an inner shell, and a fuel chamber rib. The outer shell includes an air intake and a fuel intake. The air intake is configured to receive air. The air intake has an air outlet. The fuel intake has a fuel inlet that is configured to receive fuel. The inner shell includes an inner shell intake that is configured to separately receive the air from the air outlet and the fuel from the fuel intake and to provide a gaseous fuel-air mixture. The inner shell cooperates with the outer shell to define a fuel intake collecting chamber that is configured to receive the fuel from the fuel inlet and a fuel intake concentrating chamber that is configured to receive the fuel from the fuel intake collecting chamber and provide the fuel to the inner shell intake. The fuel chamber rib is coupled to at least one of the outer shell or the inner shell. The fuel chamber rib is disposed within at least one of the fuel intake collecting chamber or the fuel intake concentrating chamber.

In another set of embodiments, a gaseous fuel-air mixer includes an outer shell, an inner shell, and a fuel chamber rib. The outer shell includes an air intake and a fuel intake. The air intake is configured to receive air. The air intake has an air outlet. The fuel intake has a fuel inlet that is configured to receive fuel. The inner shell includes an inner shell intake that is configured to separately receive the air from the air outlet and the fuel from the fuel intake and to provide a gaseous fuel-air mixture. The inner shell cooperates with the outer shell to define a fuel intake collecting chamber that is configured to receive the fuel from the fuel inlet and a fuel intake concentrating chamber that is configured to receive the fuel from the fuel intake collecting chamber and provide the fuel to the inner shell intake. The fuel chamber rib is coupled to the outer shell. The fuel chamber rib is disposed within the fuel intake collecting chamber and the fuel intake concentrating chamber. The fuel chamber rib is in confronting relation with a portion of the inner shell.

In yet another set of embodiments, a gaseous fuel-air mixer includes an outer shell, an inner shell, and a fuel chamber rib. The outer shell includes an air intake and a fuel intake. The air intake is configured to receive air. The air intake has an air outlet. The fuel intake has a fuel inlet that is configured to receive fuel. The inner shell includes an inner shell intake that is configured to separately receive the air from the air outlet and the fuel from the fuel intake and to provide a gaseous fuel-air mixture. The inner shell cooperates with the outer shell to define a fuel intake collecting chamber that is configured to receive the fuel from the fuel inlet and a fuel intake concentrating chamber that is configured to receive the fuel from the fuel intake collecting chamber and provide the fuel to the inner shell intake. The fuel chamber rib is coupled to the inner shell. The fuel chamber rib is disposed within the fuel intake concentrating chamber. The fuel chamber rib is in confronting relation with a portion of the outer shell.

BRIEF DESCRIPTION OF THE DRAWING

The details of one or more implementations are set forth in the accompanying drawing and the description below. Other features, aspects, and advantages of the disclosure will become apparent from the description, the drawing, and the claims, in which:

It will be recognized that the Figures are schematic representations for purposes of illustration. The Figure are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a gaseous fuel-air mixer for an internal combustion engine system. The various concepts introduced above and discussed in greater detail below may be implemented in any of a number of ways, as the described concepts are not limited to any particular manner of implementation. Examples of specific implementations and applications are provided primarily for illustrative purposes.

Overview

Many systems mix air and fuel upstream of an engine. These systems use mixers that include internal components to mix the fuel into the air. However, these mixers can cause a gaseous fuel-air mixture (e.g., downstream of the mixer) to have an unacceptable amount of swirl for combustion of certain fuels, such as natural gas and other fuels with relatively low calorific value. When combusting these fuels, this swirl can result in reduced mixture uniformity and/or low supply pressures (which can cause de-rating of an engine), which are undesirable.

Implementations described herein are related to an internal combustion engine system that includes a gaseous fuel-air mixer that has a fuel chamber rib that impedes swirl of the fuel prior to introduction of the fuel with a flow of air within the gaseous fuel-air mixer. By impeding swirl of the fuel in this manner, the gaseous fuel-air mixer described herein mitigates swirl of the gaseous fuel-air mixture because the fuel does not impart an unacceptable amount of swirl onto the flow of air when the fuel is introduced into the flow of air. As a result, the gaseous fuel-air mixer described herein is capable of providing superior mixture uniformity and enabling an engine to develop maximum power and/or minimum emissions. Additionally, the gaseous fuel-air mixer described herein may be capable of enabling an engine to combust fuels with relatively low calorific values without causing a de-rating of the engine and without requiring boost systems or other auxiliary components used in some conventional mixers to avoid de-rating. Additionally, the decreased swirl of the gaseous fuel-air mixture provided by the gaseous fuel-air mixer described herein may increase an efficiency of a turbocharger that receives the gaseous fuel-air mixture and may significantly decrease an overall cost of an internal combustion engine system using the gaseous fuel-air mixer described herein, compared to systems using other conventional mixers.

II. Example Internal Combustion Engine System

Figure 1A:
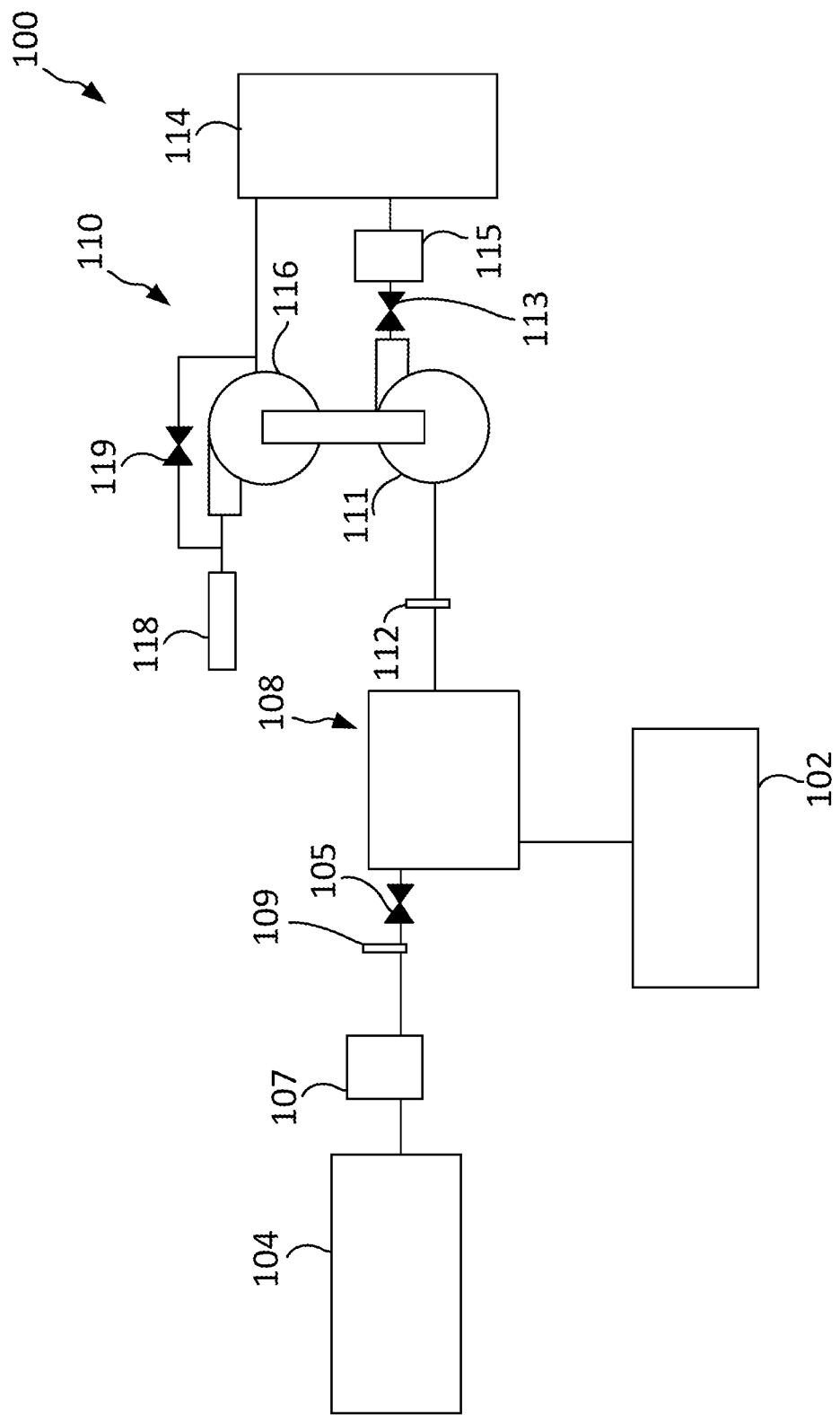
FIG. 1A is a block schematic diagram of an example internal combustion engine system with a gaseous fuel-air mixer.
Figure 1B:
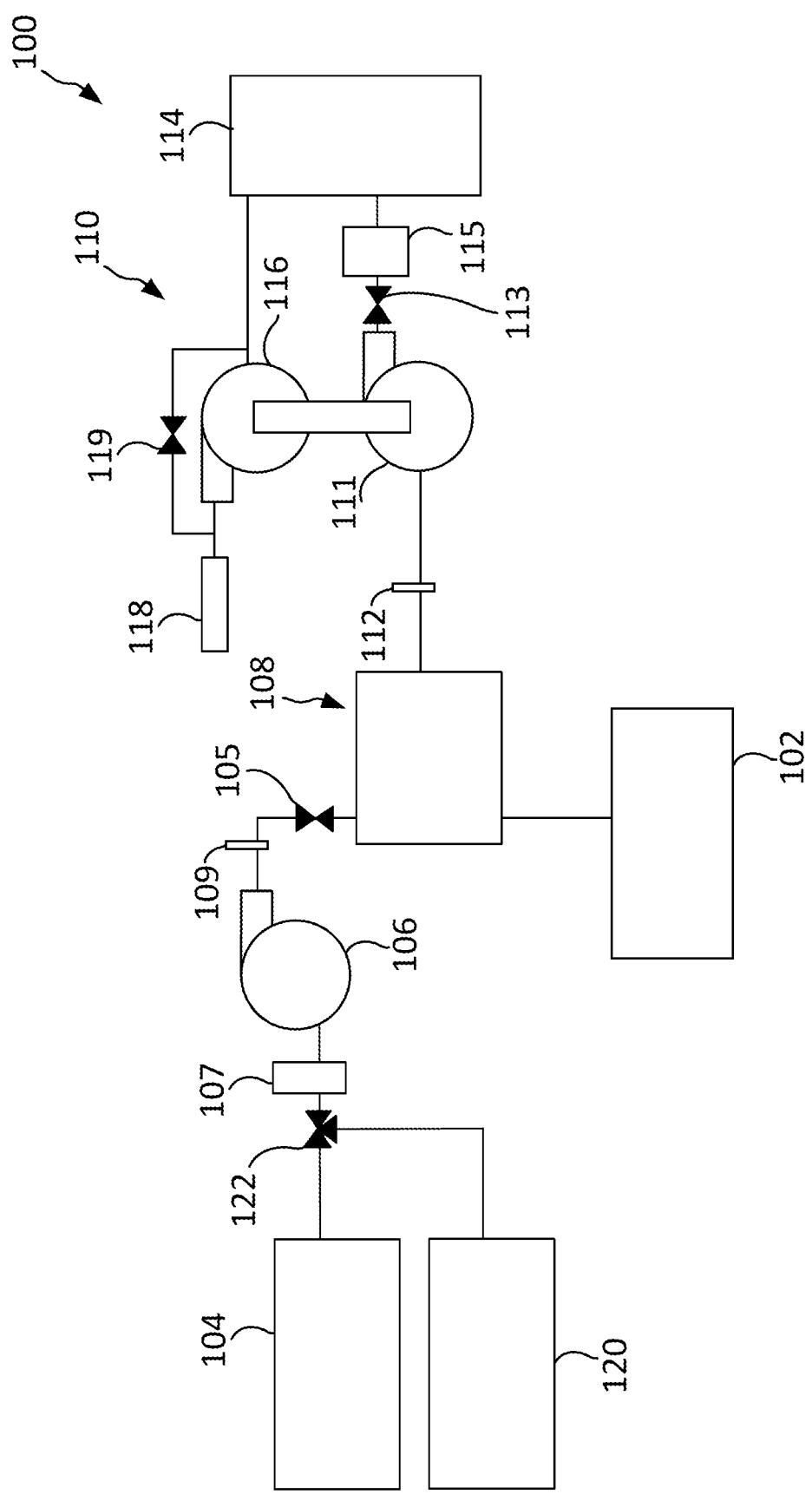
FIG. 1B is a block schematic diagram of another example internal combustion engine system with a gaseous fuel-air mixer.

FIGS. 1A and 1B depict an internal combustion engine system 100 (e.g., natural gas internal combustion engine system, lean-burn internal combustion engine system, bio-fuel internal combustion engine system, bi-fuel internal combustion engine system, etc.). As is explained in more detail herein, the internal combustion engine system 100 utilizes combustion to generate power. The internal combustion engine system 100 may be implemented in, for example, a generator (e.g., genset, standby generator, etc.), a vehicle (e.g., commercial vehicle, construction vehicle, truck, tractor trailer, automobile, military vehicle, etc.), a maritime vessel (e.g., ship, tanker, etc.), and other similar applications. The internal combustion engine system 100 is defined by an output (e.g., power, rating, etc.). For example, the output of the internal combustion engine system 100 may be between 995 kilowatts (kW) to 1540 kW, inclusive. In other embodiments, the output of the internal combustion engine system 100 may be between 1740 kW and 2088 kW, inclusive. However, the output of the internal combustion engine system 100 may be other values such that the internal combustion engine system 100 is tailored for a target application.

The internal combustion engine system 100 includes an air source 102 (e.g., air box, air intake, etc.). The air source 102 receives air from an ambient environment surrounding the internal combustion engine system 100 and provides the air into the internal combustion engine system 100 for use in combustion.

The internal combustion engine system 100 also includes a fuel source 104 (e.g., fuel tank, fuel supply, pipeline, grid infrastructure, landfill, etc.). The fuel source 104 stores fuel (e.g., natural gas, gaseous fuel, lean burn gas, propane, liquid propane, liquid natural gas, hexane, biogas, etc.) for use in combustion. In some embodiments, such as is shown in FIG. 1$i$, the internal combustion engine system 100 further includes a fan 106 (e.g., compressor, fuel pump, rotary pump, positive displacement pump, etc.). The fan 106 draws the fuel from the fuel source 104 via a fuel conduit.

The internal combustion engine system 100 also includes a fuel control valve 105 (e.g., solenoid valve, electronically controllable valve, etc.). The fuel control valve 105 is fluidly coupled to the fuel source 104 via a conduit and is configured to receive fuel from the fuel source 104. In embodiments where the fan 106 is not included, such as is shown in FIG. 1A, the fuel control valve 105 receives fuel from the fuel source 104. In embodiments where the fan 106 is included, such as is shown in FIG. 1B, the fuel control valve 105 receives the fuel from the fan 106.

The fuel control valve 105 is operable between an open position and a closed position. In the closed position, flow of the fuel through the fuel control valve 105 is prohibited (e.g., blocked, etc.) by the fuel control valve 105. Between the open position and the closed position, flow of the fuel through the fuel control valve 105 is restricted. In the open position, flow of the fuel through the fuel control valve 105 is not restricted.

In some embodiments, the internal combustion engine system 100 also includes a connection point 107 (e.g., customer connection point). The connection point 107 is configured to enable connection of an auxiliary fuel conduit between the fuel source 104 and the fuel control valve 105.

The connection point 107 may receive fuel from the fuel source 104 (e.g., as a fuel take-off, etc.) or may provide fuel to the fuel control valve 105 (e.g., as a supplement or replacement to the fuel source 104, etc.). In embodiments where the internal combustion engine system 100 does not include the fan 106, such as is shown in FIG. 1A, the fuel source 104 provides the fuel to the connection point 107, which further provides the fuel to the fuel control valve 105.

The internal combustion engine system 100 also includes a gaseous fuel-air mixer 108 (e.g., manifold, etc.). The gaseous fuel-air mixer 108 is fluidly coupled to the air source 102 via a conduit and is configured to receive air from the air source 102 via the conduit. Similarly, the gaseous fuel-air mixer 108 is fluidly coupled to the fuel control valve 105 via a conduit and is configured to receive fuel from the fuel control valve 105 via the conduit. Importantly, the air and the fuel are separate prior to being received by the gaseous fuel-air mixer 108. As is explained in more detail herein, the air and the fuel are mixed within the gaseous fuel-air mixer 108 such that operation of the internal combustion engine system 100 is more desirable than other systems without the gaseous fuel-air mixer 108. In embodiments where the internal combustion engine system 100 includes the fan 106, such as is shown in FIG. 1B, the gaseous fuel-air mixer 108 receives the fuel from the fan 106.

The fuel has an upstream fuel pressure upstream of the gaseous fuel-air mixer 108 (e.g., downstream of the fan 106, downstream of the connection point 107, etc.). As utilized herein, "upstream fuel pressure" refers to the fuel pressure between the fan 106 and the gaseous fuel-air mixer 108 and/or the fuel pressure between the connection point 107 and the gaseous fuel-air mixer 108, unless otherwise indicated.

In some embodiments, the internal combustion engine system 100 includes a sensor 109 (e.g., pressure sensor, differential pressure sensor, temperature sensor, flow rate sensor, etc.). In embodiments where the internal combustion engine system 100 does not include the fan 106, such as is shown in FIG. 1A, the sensor 109 measures the upstream fuel pressure downstream of the fuel source 104 and upstream of the gaseous fuel-air mixer 108 (e.g., downstream of the connection point 107 and upstream of the fuel control valve 105, etc.). In embodiments where the internal combustion engine system 100 includes the fan 106, such as is shown in FIG. 1B, the sensor 109 measures the upstream fuel pressure downstream of the fan 106 and upstream of the gaseous fuel-air mixer 108. In embodiments where the internal combustion engine system 100 includes the sensor 109, the internal combustion engine system 100 may also include a controller that receives the upstream fuel pressure and utilizes the upstream fuel pressure to control the internal combustion engine system 100.

The internal combustion engine system 100 also includes a turbocharger 110. The turbocharger 110 includes a compressor 111. The compressor 111 is fluidly coupled to the gaseous fuel-air mixer 108 and is configured to receive a gaseous fuel-air mixture from the gaseous fuel-air mixer 108. As is explained in more detail herein, the compressor 111 is configured to compress the gaseous fuel-air mixture (e.g., increase a pressure of the gaseous fuel-air mixture, etc.) in order to increase the output and/or efficiency (e.g., input to output, etc.) of the internal combustion engine system 100.

The fuel has a downstream fuel pressure downstream of gaseous fuel-air mixer 108 and upstream of the compressor 111. As utilized herein, "downstream fuel pressure" refers to the fuel pressure between the gaseous fuel-air mixer 108 and the compressor 111, unless otherwise indicated. In some embodiments, a pressure drop of the fuel is determined by comparing the upstream fuel pressure of fuel downstream of the connection point 107 and upstream of the gaseous fuel-air mixer 108 with the downstream fuel pressure of the fuel downstream of gaseous fuel-air mixer 108 and upstream of the compressor 111. In some embodiments, a pressure drop of the fuel is determined by comparing the upstream fuel pressure of fuel downstream of the fan 106 and upstream of the gaseous fuel-air mixer 108 with the downstream fuel pressure of the fuel downstream of gaseous fuel-air mixer 108 and upstream of the compressor 111. As is explained in more detail herein, the gaseous fuel-air mixer 108 is configured to minimize these pressure drops such that certain fuels that experience a greater pressure drop in other systems, and therefore are undesirable in these other systems, can be desirably used in the internal combustion engine system 100 (e.g., with a pressure drop of 25 millibar, etc.).

In some embodiments, the internal combustion engine system 100 includes a sensor 112 (e.g., pressure sensor, differential pressure sensor, temperature sensor, flow rate sensor, etc.) that measures the downstream fuel pressure of the fuel downstream of gaseous fuel-air mixer 108 and upstream of the compressor 111. The internal combustion engine system 100 includes a controller that receives the downstream fuel pressure and utilizes the downstream fuel pressure to control the internal combustion engine system 100.

The internal combustion engine system 100 also includes a throttle valve 113. The throttle valve 113 is fluidly coupled to the compressor 111 and configured to receive the gaseous fuel-air mixture from the compressor 111. The throttle valve 113 is operable between an open position and a closed position. In the closed position, flow of the gaseous fuel-air mixture through the throttle valve 113 is prohibited (e.g., blocked, etc.) by the throttle valve 113. Between the open position and the closed position, flow of the gaseous fuel-air mixture through the throttle valve 113 is restricted. In the open position, flow of the gaseous fuel-air mixture through the throttle valve 113 is not restricted.

The internal combustion engine system 100 also includes an internal combustion engine 114. The internal combustion engine 114 is fluidly coupled to the throttle valve 113 and is configured to receive the gaseous fuel-air mixture from the throttle valve 113. The internal combustion engine 114 includes various components such as cylinders, pistons, lubricant (e.g., oil, etc.) systems, coolant systems, a cylinder block, a cylinder head, and other similar components. The gaseous fuel-air mixture is combusted within the internal combustion engine 114 and the internal combustion engine 114 produces the output of the internal combustion engine system 100. For example, the internal combustion engine 114 may include a driveshaft that is connected to a rotor, transmission, or other component for transferring the output from the internal combustion engine system 100 to another system that utilizes the power.

In some embodiments, the internal combustion engine system 100 also includes a charge air cooler 115. The charge air cooler 115 is configured to cool the air from the compressor 111 prior to the air being provided to the internal combustion engine 114. In some embodiments, the charge air cooler 115 is disposed downstream of the throttle valve 113 (e.g., between the throttle valve 113 and the internal combustion engine 114, etc.). In some embodiments, the charge air cooler 115 is disposed upstream of the throttle valve 113 (e.g., between the compressor 111 and the throttle valve 113, etc.).

The internal combustion engine 114 produces exhaust gas. The turbocharger 110 includes a turbine 116. The turbine 116 is fluidly coupled to the internal combustion engine 114 and configured to receive the exhaust gas from the internal combustion engine 114. The turbine 116 harnesses energy within the exhaust gas (e.g., pressure of the exhaust gas, velocity of the exhaust gas, etc.) and transfers the energy to the compressor 111 (e.g., via a connecting shaft, etc.) for compressing the gaseous fuel-air mixture. In this way, the turbocharger 110 utilizes energy of an output of the internal combustion engine 114 to increase energy provided to an input of the internal combustion engine 114, thereby increasing an efficiency and/or the output of the internal combustion engine system 100.

The internal combustion engine system 100 also includes an exhaust gas outlet 118 (e.g., muffler, downpipe, stack, etc.). The exhaust gas outlet 118 is fluidly coupled to the turbine 116 and configured to receive the exhaust gas from the turbine 116. In some embodiments, the exhaust gas outlet 118 provides the exhaust gas to atmosphere directly. In other embodiments, the exhaust gas outlet 118 provides the exhaust gas to an exhaust gas aftertreatment system (e.g., a selective catalytic reduction (SCR) system, etc.) and from the exhaust gas aftertreatment system to atmosphere.

The turbocharger 110 also includes a wastegate valve 119 (e.g., purge valve, blowoff valve, etc.). The wastegate valve 119 is configured to selectively facilitate bypassing of the exhaust gas from between the internal combustion engine 114 and the turbine 116, around the turbine 116, and to the exhaust gas outlet 118. As a result, the wastegate valve 119 may protect the turbocharger 110 from undesirable pressurization of the exhaust gas within the turbine 116.

In some embodiments, such as is shown in FIG. 1B, the internal combustion engine system 100 also includes a secondary fuel source 120 (e.g., fuel tank, fuel supply, pipeline, grid infrastructure, landfill, etc.) in addition to the fuel source 104. The secondary fuel source 120 stores fuel (e.g., natural gas, gaseous fuel, lean burn gas, propane, liquid propane, liquid natural gas, hexane, biogas, etc.) for use in combustion. In some applications, the fuel stored by the secondary fuel source 120 is different from the fuel stored by the fuel source 104. For example, the secondary fuel source 120 may store biogas and the fuel source 104 may store natural gas.

In embodiments where the internal combustion engine system 100 includes the fan 106 and the secondary fuel source 120 in addition to the fuel source 104, such as is shown in FIG. 1B, the fan 106 draws the fuel from the secondary fuel source 120 via a secondary fuel conduit. In these embodiments, the internal combustion engine system 100 includes a fuel selector valve 122 (e.g., solenoid valve, electronically controllable valve, three-way valve, ball valve, etc.). The fuel selector valve 122 is fluidly coupled to the fuel source 104 and the secondary fuel source 120 and is configured to receive the fuel from the fuel source 104 and/or the secondary fuel from the secondary fuel source 120. The connection point 107 may be disposed between the fuel selector valve 122 and the fan 106.

The fuel selector valve 122 is operable between an open position and a closed position. In the closed position, flow of the secondary fuel through the fuel selector valve 122 is prohibited (e.g., blocked, etc.) by the fuel selector valve 122 (e.g., the fan 106 receives only the fuel from the fuel source 104 and does not receive any of the secondary fuel from the secondary fuel source 120, etc.). Between the open position and the closed position, flow of the fuel through the fuel selector valve 122 is restricted (e.g., the fan 106 receives the fuel from the fuel source 104 and the secondary fuel from the secondary fuel source 120, etc.). In the open position, flow of the secondary fuel from the secondary fuel source 120 through the fuel selector valve 122 is not restricted. In some embodiments, the fuel selector valve 122 is a three-way valve (e.g., mixer valve, 2700 ball valve, 180° ball valve, etc.) that is configured to simultaneously open/close flow of the fuel from both of the fuel source 104 and the secondary fuel source 120.

In some embodiments, the internal combustion engine system 100 does not include the turbocharger 110. In these embodiments, the gaseous fuel-air mixture is provided from the gaseous fuel-air mixer 108 directly to the internal combustion engine 114.

III. Example Gaseous Fuel-Air Mixers

Figure 2:
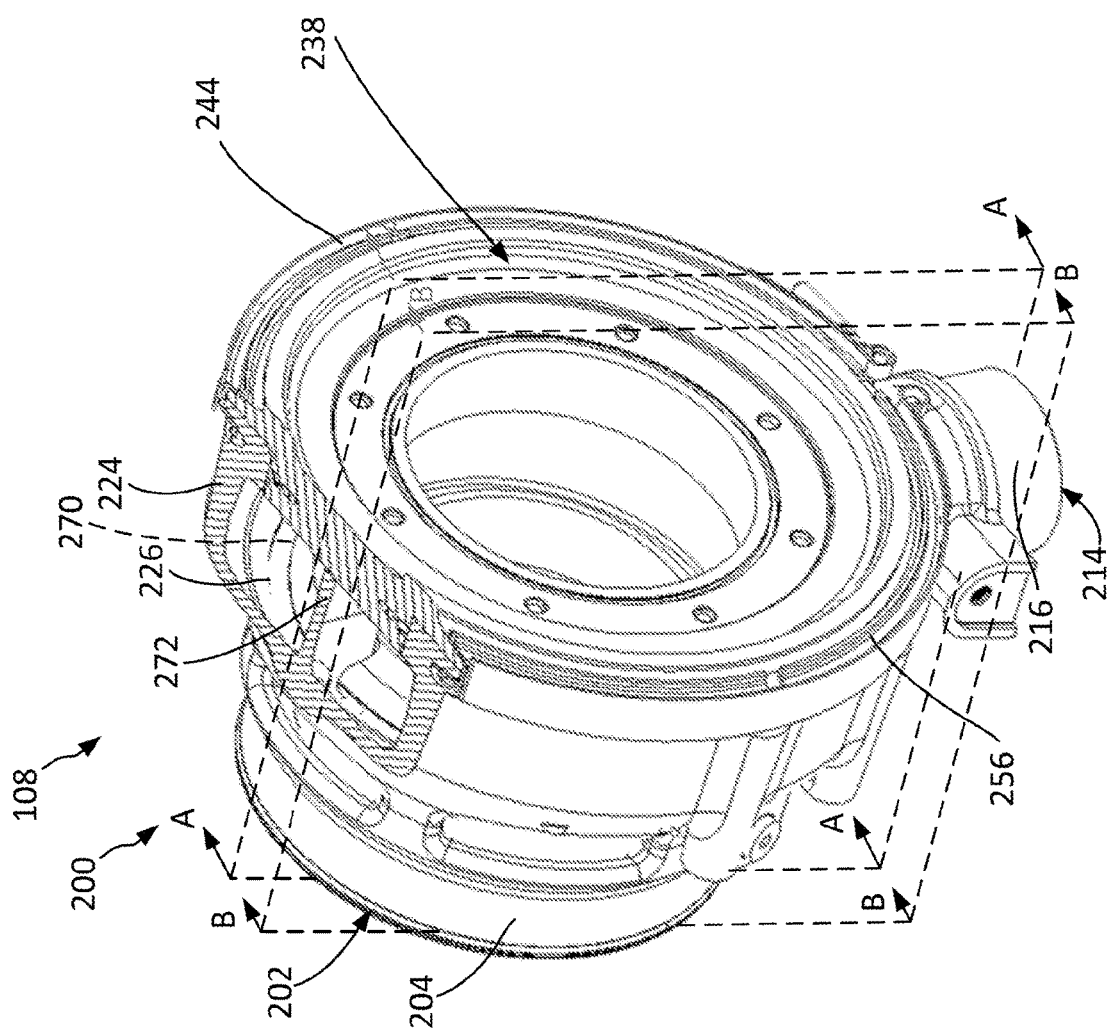
FIG. 2 is a perspective view of an example gaseous fuel-air mixer.
Figure 3:
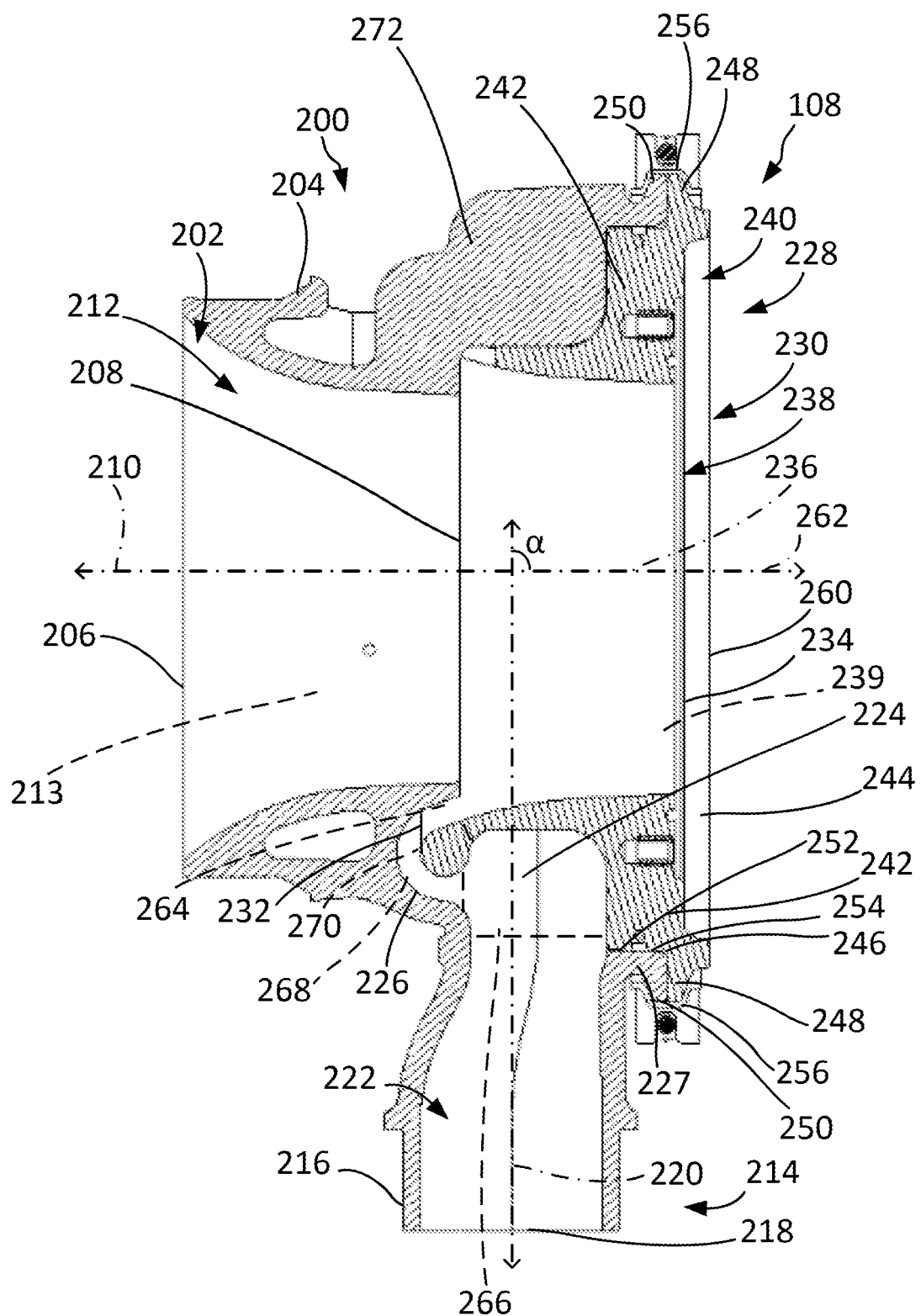
FIG. 3 is a cross-sectional view of the gaseous fuel-air mixer of FIG. 2 taken along plane A-A.

FIGS. 2 and 3 depict the gaseous fuel-air mixer 108 in greater detail according to various embodiments. The gaseous fuel-air mixer 108 includes an outer shell 200 (e.g., casing, etc.). In some embodiments, the outer shell 200 is a one-piece construction (e.g., integrally formed, unitary construction, etc.). For example, the outer shell 200 may be formed via casting, three-dimensional (3D) printing, selective laser sintering, welded fabrication, or other similar processes.

The outer shell 200 includes an air intake 202 (e.g., inlet portion, etc.). The air intake 202 is fluidly coupled to a conduit and is configured to receive air from the air source 102 via the conduit. The outer shell 200 also includes an air intake coupler 204 (e.g., rib, ring, etc.). The air intake coupler 204 extends around the air intake 202 and facilitates coupling of the outer shell 200 to the conduit that provides air from the air source 102 to the air intake 202. For example, the conduit may be disposed within the air intake 202 and secured to the outer shell 200 via a clamp (e.g., band clamp, etc.) disposed around the air intake coupler 204. In various embodiments, the outer shell 200 is coupled to the conduit such that a substantially fluid tight seal (e.g., permitting less than 1% of mass air flow through the conduit to flow between the conduit and the outer shell 200, etc.) is formed between the outer shell 200 and the conduit.

The air intake 202 includes an air inlet 206 that receives the air from the conduit. The air intake 202 also includes an air outlet 208 that provides the air from the air intake 202. In some embodiments, at least one of the air inlet 206 or the air outlet 208 (e.g., the air inlet 206 and not the air outlet 208, the air outlet 208 and not the air inlet 206, both the air inlet 206 and the air outlet 208, etc.) is centered on an air intake center axis 210. For example, in embodiments where the air inlet 206 is circular and the air inlet 206 is centered on the air intake center axis 210, the air intake center axis 210 is coincident with a center of a circle along which the air inlet 206 extends.

The air intake 202 also includes an air intake body 212 (e.g., wall, etc.) that extends between the air inlet 206 and the air outlet 208. The air intake body 212 is configured such that all of the air that is received from the air inlet 206 by the air intake body 212 is provided to the air outlet 208.

The air intake body 212 defines an air intake body chamber 213 (e.g., void, cavity, etc.). In various embodiments, the air intake body 212 is configured such that a cross-sectional area of the air intake body chamber 213 (e.g., along a plane that is orthogonal to the air intake center axis 210, etc.) decreases at least partially along the air intake center axis 210 from the air inlet 206 to the air outlet 208. In these embodiments, a velocity of the air may be increased by the air intake body 212 (e.g., a velocity of the air entering the air inlet 206 is lower than a velocity of the air exiting the air outlet 208, etc.).

Furthermore, the air intake body 212 may be configured such that a rate of change of the decrease in the shape and/or the size of the air intake body chamber 213 varies (e.g., decreases, etc.) along the air intake center axis 210 from the air inlet 206 to the air outlet 208. In various embodiments, the air intake body 212 is configured such that the cross-sectional size of the air intake body chamber 213 decreases at a higher rate of change proximate the air inlet 206 than proximate the air outlet 208. Still further, the air intake body 212 may be configured such that the rate of change of the decrease in the shape and/or the size of the air intake body chamber 213 gradually decreases along the air intake center axis 210 from the air inlet 206 to the air outlet 208. As a result, the air intake body chamber 213 may have a cross-sectional shape along a plane that is coincident with the air intake center axis 210 that is partially hyperbolic. In some embodiments, the air intake body 212 may be substantially shaped as a frustum of a hyperbolic hyperboloid of revolution (e.g., circular hyperboloid) and that converges towards the air intake center axis 210. For example, a diameter of the air intake body chamber 213 may gradually decrease from the air inlet 206 to the air outlet 208 such that the air intake body 212 functions to funnel (e.g., direct, concentrate, etc.) the air to the air outlet 208. In some embodiments, both the air inlet 206 and the air outlet 208 are circular and a diameter of the air inlet 206 is greater than a diameter of the air outlet 208.

The outer shell 200 also includes a fuel intake 214 (e.g., inlet portion, etc.). The fuel intake 214 is fluidly coupled to a conduit and is configured to receive fuel from the fuel source 104 (e.g., after flowing through the fan 106, after flowing through the connection point 107, etc.) via the conduit. The outer shell 200 also includes a fuel intake coupler 216 (e.g., rib, ring, etc.). The fuel intake coupler 216 extends around the fuel intake 214 and facilitates coupling of the outer shell 200 to the conduit that provides fuel from the fuel source 104 to the fuel intake 214. For example, the conduit may be disposed within the fuel intake 214 and secured to the outer shell 200 via a clamp (e.g., band clamp, etc.) disposed around the fuel intake coupler 216. In various embodiments, the outer shell 200 is coupled to the conduit such that a substantially fluid tight seal (e.g., permitting less than 1% of mass fuel flow through the conduit to flow between the conduit and the outer shell 200, etc.) is formed between the outer shell 200 and the conduit.

The fuel intake 214 includes a fuel inlet 218 that receives the fuel from the conduit. The fuel inlet 218 is centered on a fuel intake center axis 220. For example, in embodiments where the fuel inlet 218 is circular, the fuel intake center axis 220 is coincident with a center of a circle along which the fuel inlet 218 extends.

The fuel intake center axis 220 may intersect the air intake center axis 210. The fuel intake center axis 220 may be separated from the air intake center axis 210 by a separation angle α that is measured along a plane along which both the fuel intake center axis 220 and the air intake center axis 210 are disposed. In various embodiments, the a is substantially equal to (e.g., within 5% of, etc.) 90° (e.g., 86°, 87°, 90°, 91°, 93°, etc.). In some embodiments, the a is between approximately (e.g., within 5% of, etc.) 60° (e.g., 58°, 60°, 62°, etc.) and 90° (e.g., 88°, 90°, 92°, etc.). In some embodiments, the a is between approximately (e.g., within 5% of, etc.) 45° (e.g., 43°, 45°, 47°, etc.) and 60° (e.g., 58°, 60°, 62°, etc.). In some embodiments, the a is between approximately (e.g., within 5% of, etc.) 60° (e.g., 58°, 60°, 62°, etc.) and 90° (e.g., 88°, 90°, 92°, etc.). In some embodiments, the a is between approximately (e.g., within 5% of, etc.) 0° (e.g., 0°, etc.) and 180° (e.g., 171°, 180°, 189°, etc.). In some embodiments, the a is less than 0° (e.g., −20°, −50°, −90°, etc.). In some embodiments, the a is greater than 180° (e.g., 200°, 220°, 270°, etc.).

The fuel intake 214 also includes a fuel intake body 222 (e.g., wall, etc.) that extends from the fuel inlet 218 towards the air intake center axis 210. As is explained in more detail herein, the fuel intake body 222 cooperates with other components of the gaseous fuel-air mixer 108 to ensure that all of the fuel that is received by the fuel inlet 218 is provided from the fuel intake 214.

The fuel intake body 222 includes a fuel intake collecting wall 224. The fuel intake collecting wall 224 extends around the fuel intake center axis 220. The fuel intake collecting wall 224 receives the fuel from the fuel inlet 218 and distributes the fuel within the fuel intake 214 and around the fuel intake center axis 220. In various embodiments, the fuel intake collecting wall 224 is at least partially annular.

The fuel intake body 222 also includes a fuel intake concentrating wall 226. The fuel intake concentrating wall 226 is contiguous with the fuel intake collecting wall 224. The fuel intake concentrating wall 226 extends around the air intake center axis 210. A portion of the fuel intake concentrating wall 226 is separated from the air intake 202 by the air intake body 212. As is described in more detail herein, the fuel intake concentrating wall 226 receives the fuel from the fuel intake collecting wall 224 and provides the fuel out of the fuel intake 214 and around the air intake center axis 210. In various embodiments, the fuel intake concentrating wall 226 is at least partially annular.

The outer shell 200 also includes an outer shell outer wall 227. The outer shell outer wall 227 is contiguous with the fuel intake collecting wall 224. Additionally, the outer shell outer wall 227 extends around the air intake center axis 210. In various embodiments, the outer shell outer wall 227 is at least partially annular.

The gaseous fuel-air mixer 108 also includes an inner shell 228 (e.g., casing, etc.). In some embodiments, the inner shell 228 is a one-piece construction (e.g., integrally formed, unitary construction, machined from solid, etc.). For example, the inner shell 228 may be formed via casting, 3D printing, selective laser sintering, or other similar processes.

The inner shell 228 includes an inner shell intake 230 (e.g., inlet portion, etc.). In some embodiments, the inner shell intake 230 includes an inner shell intake inlet 232 that receives air from the air intake 202 and fuel from the fuel intake 214.

As shown in FIG. 3, a portion of the air intake 202 extends into the inner shell intake 230. As a result, the inner shell intake inlet 232 is positioned upstream of the air outlet 208. As is explained in more detail herein, this arrangement causes the air intake body 212 to separate the air (e.g., within the air intake 202, etc.) from the fuel (e.g., within the inner shell intake 230, etc.) proximate the air outlet 208. In other embodiments, the air intake 202 does not extend into the inner shell intake 230.

The inner shell intake 230 also includes an inner shell intake outlet 234 that provides the air and the fuel from the inner shell intake 230. At least one of the inner shell intake inlet 232 or the inner shell intake outlet 234 (e.g., the inner shell intake inlet 232 and not the inner shell intake outlet 234, the inner shell intake outlet 234 and not the inner shell intake inlet 232, both the inner shell intake inlet 232 and the inner shell intake outlet 234, etc.) is centered on an inner shell intake center axis 236. For example, in embodiments where the inner shell intake inlet 232 is circular and the inner shell intake inlet 232 is centered on the inner shell intake center axis 236, the inner shell intake center axis 236 is coincident with a center of a circle along which the inner shell intake inlet 232 extends.

As shown in FIG. 3, the inner shell intake center axis 236 is coincident with the air intake center axis 210. In other words, the inner shell intake inlet 232 and/or the inner shell intake outlet 234 is centered on the air intake center axis 210 and the air inlet 206 and/or the air outlet 208 is centered on the inner shell intake inlet 232. However, in other embodiments, the inner shell intake center axis 236 is different from the air intake center axis 210. For example, the inner shell intake center axis 236 may be spaced apart from and/or angled relative to the air intake center axis 210. For example, the inner shell intake center axis 236 may not be coincident with the air intake center axis 210.

In various embodiments, the inner shell intake 230 is substantially frustoconical and converges towards the inner shell intake center axis 236. For example, a diameter of the inner shell intake 230 may gradually decrease from the inner shell intake inlet 232 to the inner shell intake outlet 234 such that the inner shell intake 230 functions to funnel (e.g., direct, concentrate, etc.) the air and fuel mixture to the inner shell intake outlet 234. In these embodiments, a velocity of the air and fuel mixture may be increased by the inner shell intake 230 (e.g., a velocity of the air at the air outlet 208 is lower than a velocity of the air and fuel mixture exiting the inner shell intake outlet 234, etc.). In some embodiments, both the inner shell intake inlet 232 and the inner shell intake outlet 234 have circular cross-sections and a diameter of the inner shell intake inlet 232 is greater than a diameter of the inner shell intake outlet 234.

The inner shell intake 230 also includes an inner shell intake body 238 (e.g., wall, etc.) that extends between the inner shell intake inlet 232 and the inner shell intake outlet 234. The inner shell intake body 238 is configured such that all of the air that is received from the air intake 202 and all of the fuel that is received from the fuel intake 214 is provided to the inner shell intake outlet 234.

The inner shell intake body 238 defines an inner shell intake body chamber 239 (e.g., void, cavity, etc.). In various embodiments, the inner shell intake body 238 is configured such that a shape and/or a size (e.g., along a plane that is orthogonal to the inner shell intake center axis 236, etc.) of the inner shell intake body chamber 239 decrease at least partially along the inner shell intake center axis 236 from the inner shell intake inlet 232 to the inner shell intake outlet 234. In these embodiments, a velocity of the air may be increased by the inner shell intake body 238 (e.g., a velocity of the air at the air outlet 208 is lower than a velocity of the air and fuel mixture exiting the inner shell intake outlet 234, etc.).

Furthermore, the inner shell intake body 238 may be configured such that a rate of change of the decrease in the shape and/or the size of the inner shell intake body chamber 239 varies (e.g., decreases, etc.) along the inner shell intake center axis 236 from the inner shell intake inlet 232 to the inner shell intake outlet 234. In various embodiments, the inner shell intake body 238 is configured such that the size of the inner shell intake body chamber 239 decreases at a higher rate of change proximate the inner shell intake inlet 232 than proximate the inner shell intake outlet 234. Still further, the inner shell intake body 238 may be configured such that the rate of change of the decrease in the shape and/or the size of the inner shell intake body chamber 239 gradually decreases along the inner shell intake center axis 236 from the inner shell intake inlet 232 to the inner shell intake outlet 234. As a result, the inner shell intake body chamber 239 may have a cross-sectional shape along a plane that is coincident with the inner shell intake center axis 236 that is partially hyperbolic. In some embodiments, the inner shell intake body 238 may be substantially shaped as a frustum of a hyperbolic hyperboloid of revolution (e.g., circular hyperboloid) and that converges towards the inner shell intake center axis 236. For example, a diameter of the inner shell intake body chamber 239 may gradually decrease from the inner shell intake inlet 232 to the inner shell intake outlet 234 such that the inner shell intake body 238 functions to funnel (e.g., direct, concentrate, etc.) the air and fuel mixture to the inner shell intake outlet 234. In some embodiments, both the inner shell intake inlet 232 and the inner shell intake outlet 234 are circular and a diameter of the inner shell intake inlet 232 is greater than a diameter of the inner shell intake outlet 234.

The inner shell 228 also includes an inner shell output 240 (e.g., body, etc.). The inner shell output 240 is fluidly coupled to the inner shell intake 230 and is configured to receive the air and the fuel from the inner shell intake 230. The inner shell output 240 is fluidly coupled to a conduit, such as the conduit extending between the gaseous fuel-air mixer 108 and the compressor 111, and is configured to provide the air and the fuel received from the inner shell intake 230 to the conduit.

As is explained in more detail herein, the inner shell output 240 also facilitates coupling of the inner shell 228 to the outer shell 200 such that a substantially fluid tight seal is present between the inner shell 228 and the outer shell 200. The inner shell output 240 includes an inner shell dividing wall 242 that extends from the inner shell intake 230 radially outward (e.g., away from the inner shell intake center axis 236, etc.). In various embodiments, the inner shell dividing wall 242 is at least partially annular.

The inner shell output 240 also includes an inner shell outer wall 244 that is contiguous with the inner shell dividing wall 242 and is separated from the inner shell intake 230 by the inner shell dividing wall 242. In various embodiments, the inner shell outer wall 244 is at least partially annular.

In various embodiments, the inner shell outer wall 244 is spaced apart from the inner shell intake body 238 by a gap. This gap may receive a portion of a conduit that is coupled to the inner shell 228. For example, an end of the conduit that is coupled to the inner shell 228 may be positioned within the inner shell 228 and disposed between the inner shell outer wall 244 and the inner shell intake body 238.

The inner shell outer wall 244 includes an inner shell coupling surface 246 and an inner shell coupling flange 248 adjacent the inner shell coupling surface 246. When the outer shell 200 is coupled to the inner shell 228, the inner shell coupling surface 246 is in confronting relation with an outer shell coupling surface 252 of the outer shell outer wall 227 and the inner shell coupling flange 248 is in confronting relation with an outer shell coupling flange 250. The outer shell 200 may also be coupled to the inner shell 228 in other arrangements.

A small gap (e.g., less than 5 millimeters, less than 2 millimeters, less than 1 millimeter, less than 0.5 millimeters, less than 0.25 millimeters, etc.) is present between the inner shell coupling surface 246 and the outer shell coupling surface 252 when the outer shell 200 is coupled to the inner shell 228. This small gap facilitates displacement of the outer shell 200 relative to the inner shell 228. In this way, the inner shell 228 may be inserted into, and removed from, the outer shell 200.

A seal member 254 (e.g., o-ring, gasket, liquid sealant, etc.) is located between the inner shell coupling surface 246 and the outer shell coupling surface 252. The seal member 254 may facilitate establishment of a substantially fluid tight seal between the inner shell coupling surface 246 and the outer shell coupling surface 252. The seal member 254 may be seated (e.g., contained, positioned, etc.) within a groove (e.g., cavity, seat, etc.) formed in the inner shell coupling surface 246 and/or the outer shell coupling surface 252. In some embodiments, a seal member may be included between the outer shell outer wall 227 and the inner shell coupling flange 248.

The gaseous fuel-air mixer 108 also includes a band clamp 256 (e.g., V-band clamp, Marmon clamp, etc.). The band clamp 256 interfaces with both the inner shell coupling flange 248 and the outer shell coupling flange 250 to couple the outer shell 200 and the inner shell 228. Specifically, tightening of the band clamp 256 towards the inner shell intake center axis 236 causes the inner shell coupling flange 248 and the outer shell coupling flange 250 to be drawn closer together and, ultimately, causes the outer shell 200 to be coupled to the inner shell 228. In some embodiments, the band clamp 256 is replaced or supplemented with a bolted connection (e.g., between the inner shell coupling flange 248 and the outer shell coupling flange 250, etc.).

In some embodiments, the gaseous fuel-air mixer 108 does not include the band clamp 256 but includes another mechanism (e.g., bolts, welds, threads, etc.) for coupling the inner shell coupling flange 248 and the outer shell coupling flange 250. For example, the inner shell coupling flange 248 may be welded or bolted to the outer shell coupling flange 250.

In some embodiments, the inner shell 228 also includes an inner shell coupler (e.g., rib, ring, etc.). The inner shell coupler extends around the inner shell outer wall 244 and facilitates coupling of the inner shell 228 to the conduit that receives the air and the fuel from the gaseous fuel-air mixer 108. For example, the conduit may be disposed around the inner shell 228 and secured to the inner shell 228 via a clamp (e.g., band clamp, etc.) disposed around the inner shell coupler. In various embodiments, the inner shell 228 is coupled to the conduit such that a substantially fluid tight seal (e.g., permitting less than 1% of mass gaseous fuel-air flow through the conduit to flow between the conduit and the inner shell 228, etc.) is formed between the inner shell 228 and the conduit.

The inner shell output 240 also includes an inner shell outlet 260. The inner shell outlet 260 is contiguous with the inner shell outer wall 244. The inner shell outlet 260 is centered on an inner shell outlet center axis 262. For example, in embodiments where the inner shell outlet 260 is circular, the inner shell outlet center axis 262 is coincident with a center of a circle along which the inner shell outlet 260 extends.

As shown in FIG. 3, the inner shell outlet center axis 262 is coincident with the inner shell intake center axis 236. However, in other embodiments, the inner shell outlet center axis 262 is different from the inner shell intake center axis 236. For example, the inner shell outlet center axis 262 may be spaced apart from and/or angled relative to the inner shell intake center axis 236.

A fuel outlet 264 of the fuel intake 214 is defined between the air intake body 212 and the inner shell intake body 238 when the inner shell 228 is coupled to the outer shell 200. In operation, the fuel flows from the conduit into the fuel inlet 218. The fuel then flows into a fuel intake collecting chamber 266 (e.g., void, cavity, etc.). The fuel intake collecting chamber 266 is defined by the fuel intake collecting wall 224, the inner shell dividing wall 242, and the inner shell intake 230. The fuel intake collecting chamber 266 is at least partially annular and extends along the fuel intake collecting wall 224.

The fuel flows from the fuel intake collecting chamber 266 into a fuel intake concentrating chamber 268 (e.g., void, cavity, etc.). The fuel intake concentrating chamber 268 is defined between the fuel intake concentrating wall 226, the air intake body 212, and the inner shell intake body 238. The inner shell intake body 238 includes a lobe 270 (e.g., end, etc.). The fuel flows along the lobe 270 within the fuel intake concentrating chamber 268. The fuel intake concentrating wall 226 is defined by a first radius of curvature and the lobe 270 is defined by a second radius of curvature.

In various embodiments, lobe 270 and the fuel intake concentrating wall 226 are configured such that the first radius of curvature is substantially equal to (e.g., within 5% of, equal to, etc.) the second radius of curvature. In these embodiments, a width of the fuel intake concentrating chamber 268 (e.g., a distance between the lobe 270 and the fuel intake concentrating wall 226, etc.) is substantially constant along a length (e.g., a distance between the fuel intake collecting chamber 266 and the fuel outlet 264, etc.) of the fuel intake concentrating chamber 268. Additionally, this provides the gaseous fuel-air mixer 108 with a lower pressure drop (e.g., a difference between a pressure of the air upstream of the gaseous fuel-air mixer 108 and a pressure of the air and fuel mixture downstream of the gaseous fuel-air mixer 108, etc.) than other mixers that pass fuel through chambers of vastly differing widths. Differences in widths of chambers in such other mixers increases can, in some instances, cause an increase in backpressure of these mixers, which is undesirable. In some embodiments, a radius of curvature of the lobe 270 and/or a radius of curvature of the fuel intake concentrating wall 226 are selected to minimize fuel pressure drop while delivering excellent mixture uniformity around a periphery of the air flow.

The fuel exits the fuel intake concentrating chamber 268 via the fuel outlet 264. The fuel flow from the fuel outlet 264 into the inner shell intake body 238. The fuel is distributed uniformly around the air within the inner shell intake body 238 and the fuel and the air are propelled into the conduit downstream of the gaseous fuel-air mixer 108 via the inner shell intake body 238.

As shown in FIGS. 2 and 3, the gaseous fuel-air mixer 108 also includes at least one fuel chamber rib 272. The fuel chamber rib 272 protrudes across the fuel intake collecting chamber 266 so as to impede flow of the fuel (e.g., permitting less than 5% of mass fuel flow, etc.) within the fuel intake collecting chamber 266 from one side (e.g., a left side, a right side, a front side, a back side, etc.) of the fuel chamber rib 272 to the other side of the fuel chamber rib 272 (e.g., a right side, a left side, a back side, a front side, etc.). The fuel chamber rib 272 also protrudes across the fuel intake concentrating chamber 268 so as to impede (e.g., permitting less than 25% of mass fuel flow, etc.) flow of the fuel within the fuel intake concentrating chamber 268 from one side (e.g., a left side, a right side, a front side, a back side, etc.) of the fuel chamber rib 272 to the other side of the fuel chamber rib 272 (e.g., a right side, a left side, a back side, a front side, etc.). In this way, the fuel chamber rib 272 mitigates swirl of the fuel (e.g., around the air intake center axis 210, etc.) within the fuel intake collecting chamber 266 and the fuel intake concentrating chamber 268. By mitigating swirl of the fuel, the fuel chamber rib 272 mitigates the swirl imparted on the air within the inner shell intake body 238 by the fuel exiting the fuel outlet 264 and therefore mitigates the swirl of the air and the fuel within the inner shell intake body 238 and within the conduit downstream of the gaseous fuel-air mixer 108.

Figure 4:
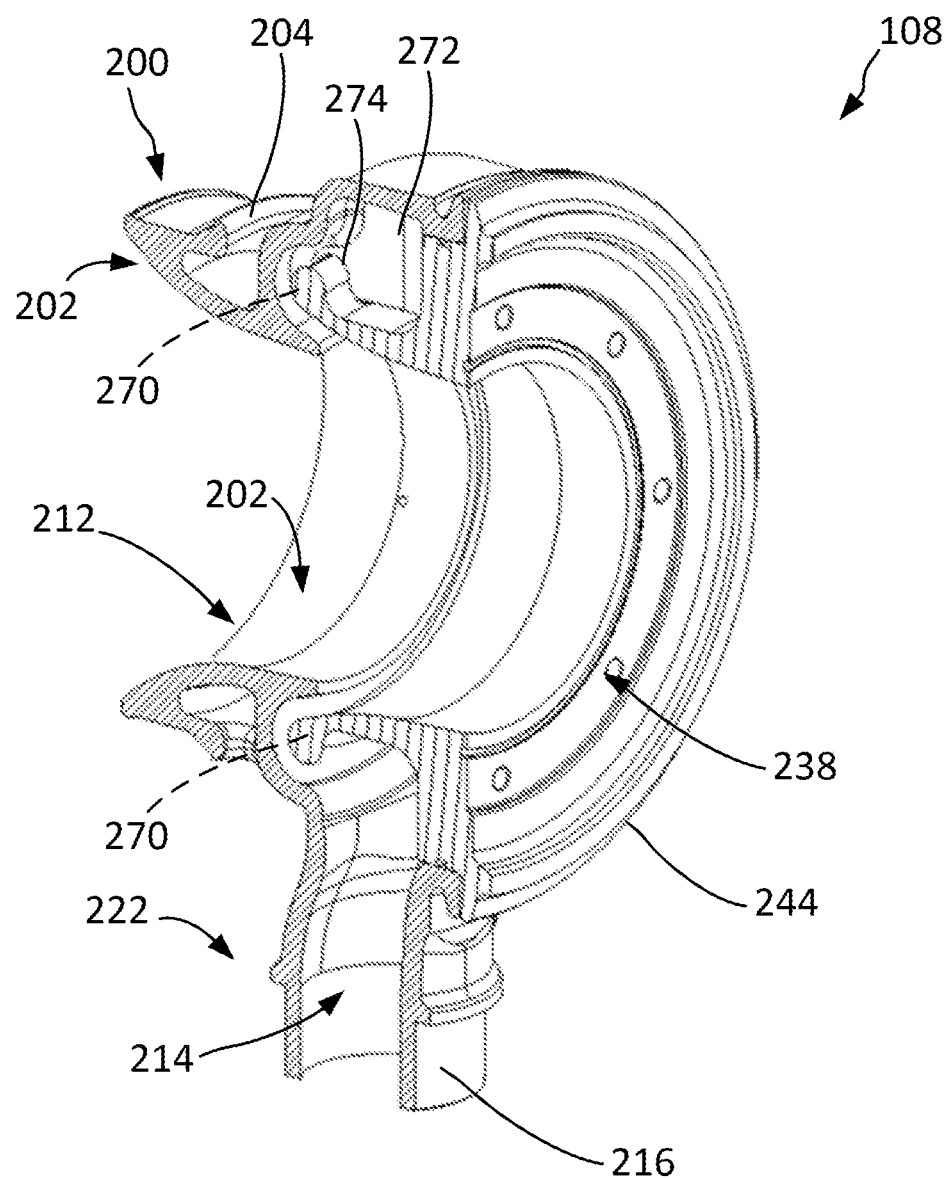
FIG. 4 is a cross-sectional view of the gaseous fuel-air mixer of FIG. 2 taken along plane B-B.

In some embodiments, such as is shown in FIG. 4, the gaseous fuel-air mixer 108 includes only one of the fuel chamber ribs 272. In these embodiments, the fuel chamber rib 272 may be located diametrically opposite the fuel inlet 218. In other words, fuel chamber rib 272 may be disposed along the fuel intake center axis 220 and separated from the fuel inlet 218 by 180°. This arrangement may be beneficial because the fuel chamber rib 272 evenly divides the fuel and costs of the gaseous fuel-air mixer 108 associated with the fuel chamber rib 272 are minimized.

The gaseous fuel-air mixer 108 may include more than one fuel chamber rib 272. For example, the gaseous fuel-air mixer 108 may include two, three, four, five, six, seven, eight, or more fuel chamber ribs 272. The fuel chamber ribs 272 may be uniformly angularly spaced about at least one of the air intake center axis 210, the inner shell intake center axis 236, or the inner shell outlet center axis 262. For example, the gaseous fuel-air mixer 108 may include three fuel chamber ribs 272 that are angularly spaced apart by 120° from adjacent fuel chamber ribs 272.

In various embodiments, the fuel chamber rib 272 protrudes across the fuel intake collecting chamber 266 so as to prohibit (e.g., permitting less than 1% of mass fuel flow, etc.) flow of the fuel within the fuel intake collecting chamber 266 from one side (e.g., a left side, a right side, a front side, a back side, etc.) of the fuel chamber rib 272 to the other side of the fuel chamber rib 272 (e.g., a right side, a left side, a back side, a front side, etc.). The fuel chamber rib 272 also protrudes across the fuel intake concentrating chamber 268 so as to prohibit (e.g., permitting less than 5% of mass fuel flow, etc.) flow of the fuel within the fuel intake concentrating chamber 268 from one side (e.g., a left side, a right side, a front side, a back side, etc.) of the fuel chamber rib 272 to the other side of the fuel chamber rib 272 (e.g., a right side, a left side, a back side, a front side, etc.).

By mitigating swirl of the air and fuel within the conduit downstream of the gaseous fuel-air mixer 108, the gaseous fuel-air mixer 108 has a lower pressure drop (e.g., a difference between a pressure of the air upstream of the gaseous fuel-air mixer 108 and a pressure of the air and fuel mixture downstream of the gaseous fuel-air mixer 108, etc.) than other mixers that do not include the fuel chamber rib 272. This decrease in pressure drop enables the internal combustion engine system 100 to combust fuels (e.g., low calorific fuels, natural gas, fuels with a calorific value of less than 450 British Thermal Units per standard cubic foot of gas, etc.) that could not be combusted in an engine system that does not include a mixer with the fuel chamber rib 272 without de-rating of the engine system or installation of a pressure boost system or other components (e.g., larger fuel control valves, larger diameter pipe work, etc.), which are all undesirable.

Additionally, the decrease in swirl of the air and the fuel provided to the compressor 111, as well as the increased mixture uniformity of the air and the fuel, may provide the turbocharger 110 with several advantages over turbochargers in other systems that do not include the fuel chamber rib 272. For example, the decrease in swirl may provide an increase in efficiency of the turbocharger 110 compared to turbochargers in other systems that do not include the fuel chamber rib 272 because there is less resistance to movement of the wheel within the compressor 111. Furthermore, service life of components of the turbocharger 110 may be lengthened compared to components in turbochargers in other systems that do not include the fuel chamber rib 272 because the decrease in swirl provides more uniform loading (e.g., aerodynamic loading, etc.) on components within the turbocharger 110.

In some embodiments, the fuel chamber rib 272 protrudes across the fuel intake collecting chamber 266 so as to permit less than 5% (e.g., 1%, 2%, etc.) of mass fuel flow within the fuel intake collecting chamber 266 from one side of the fuel chamber rib 272 to the other side of the fuel chamber rib 272. In these embodiments, the fuel chamber rib 272 may also protrude across the fuel intake concentrating chamber 268 so as to permit less than 15% (e.g., 10%, 5%, etc.) of mass fuel flow within the fuel intake concentrating chamber 268 from one side of the fuel chamber rib 272 to the other side of the fuel chamber rib 272.

In some embodiments, such as is shown in FIGS. 2-5, the fuel chamber rib 272 is integrally formed with the outer shell 200. The fuel chamber rib 272 may be integrally formed with the fuel intake collecting wall 224 and the fuel intake concentrating wall 226. The fuel chamber rib 272 is in confronting relation with the inner shell intake body 238 and the inner shell dividing wall 242 when the outer shell 200 is coupled to the inner shell 228. Specifically, a profile of the fuel chamber rib 272 matches a profile of the inner shell intake body 238 and the inner shell dividing wall 242. In some embodiments, the fuel chamber rib 272 interfaces with at least one of the inner shell intake body 238 and the inner shell dividing wall 242 when the outer shell 200 is coupled to the inner shell 228.

Figure 5:
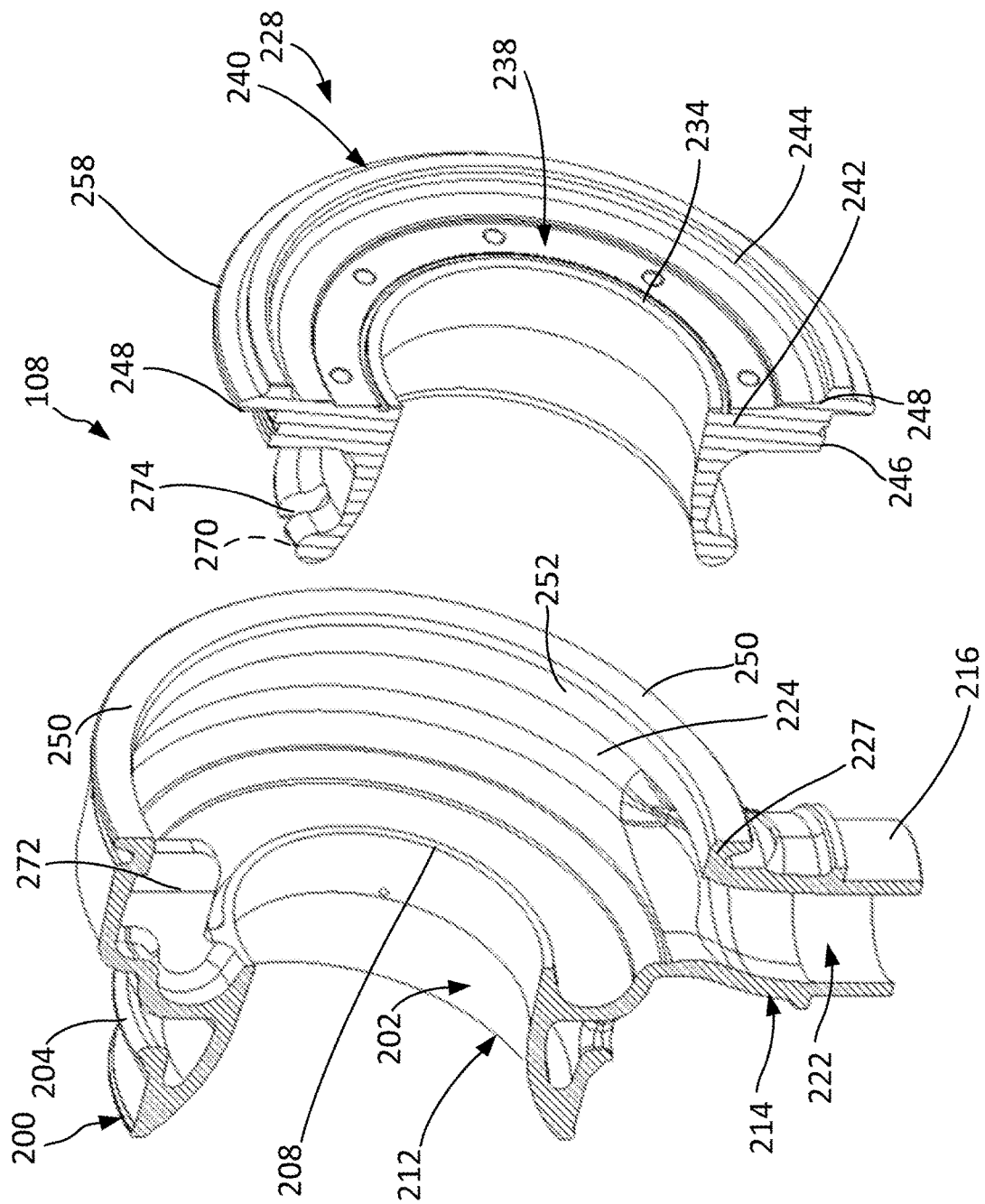
FIG. 5 is an exploded view of the cross-sectional view shown in FIG. 4.

In various embodiments, the inner shell intake body 238 includes at least one slot 274 (e.g., channel, groove, etc.), as shown in FIGS. 4 and 5. The slot 274 receives the fuel chamber rib 272 as the inner shell 228 is inserted into the outer shell 200. The slot 274 extends through the lobe 270. In some embodiments, the slot 274 extends along an axis that is parallel to at least one of the air intake center axis 210, the inner shell intake center axis 236, or the inner shell outlet center axis 262. As a result of this alignment, the slot 274 may receive the fuel chamber rib 272 without rotation of the outer shell 200 relative to the inner shell 228. However, in other embodiments, the slot 274 receives the fuel chamber rib 272 via rotation of the outer shell 200 relative to the inner shell 228 (e.g., when the slot 274 is at least partially curved along the inner shell intake body 238, etc.). In some embodiments, the number of the slots 274 is equal to the number of the fuel chamber ribs 272.

Figure 6:
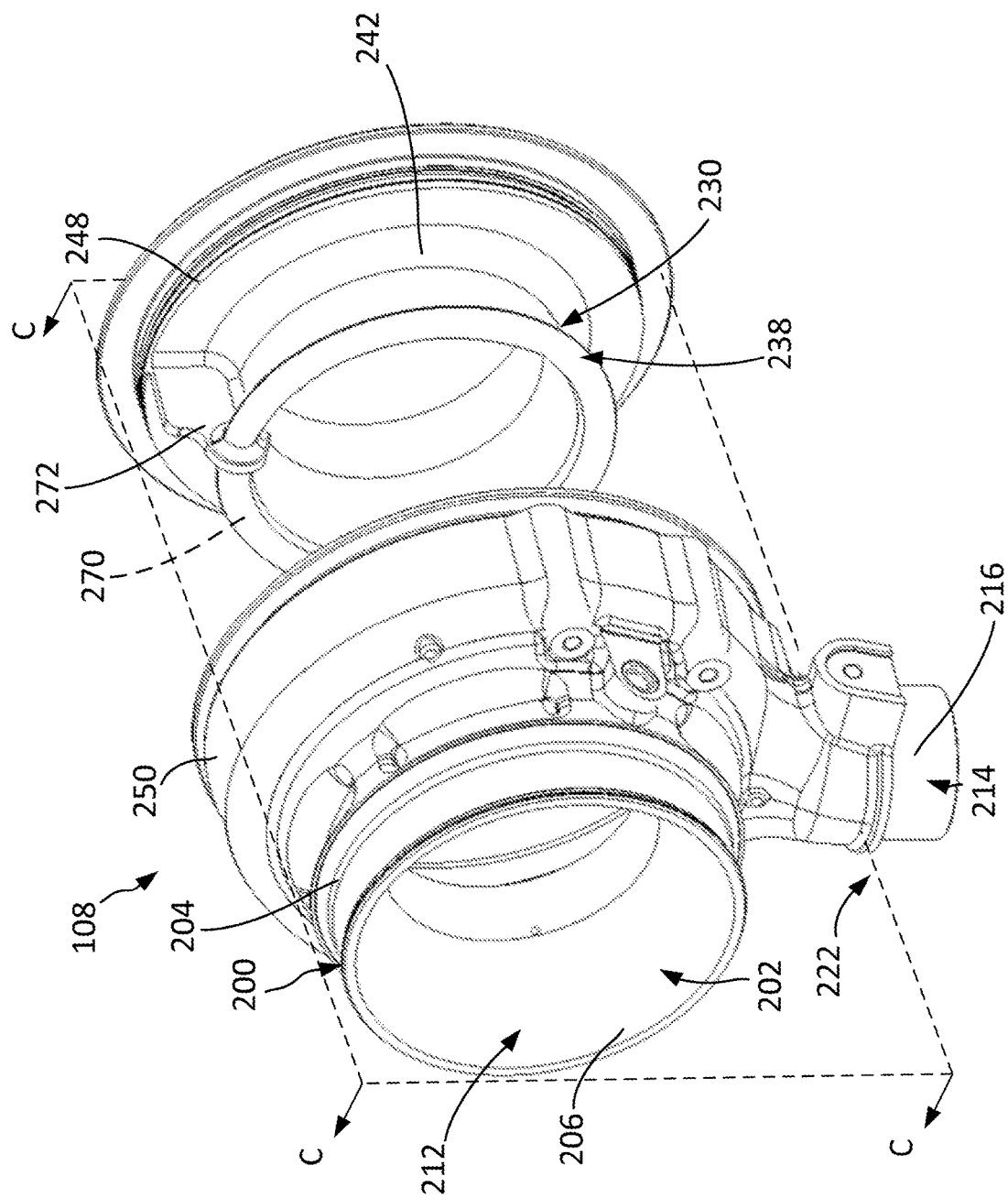
FIG. 6 is a perspective view of another example gaseous fuel-air mixer.
Figure 7:
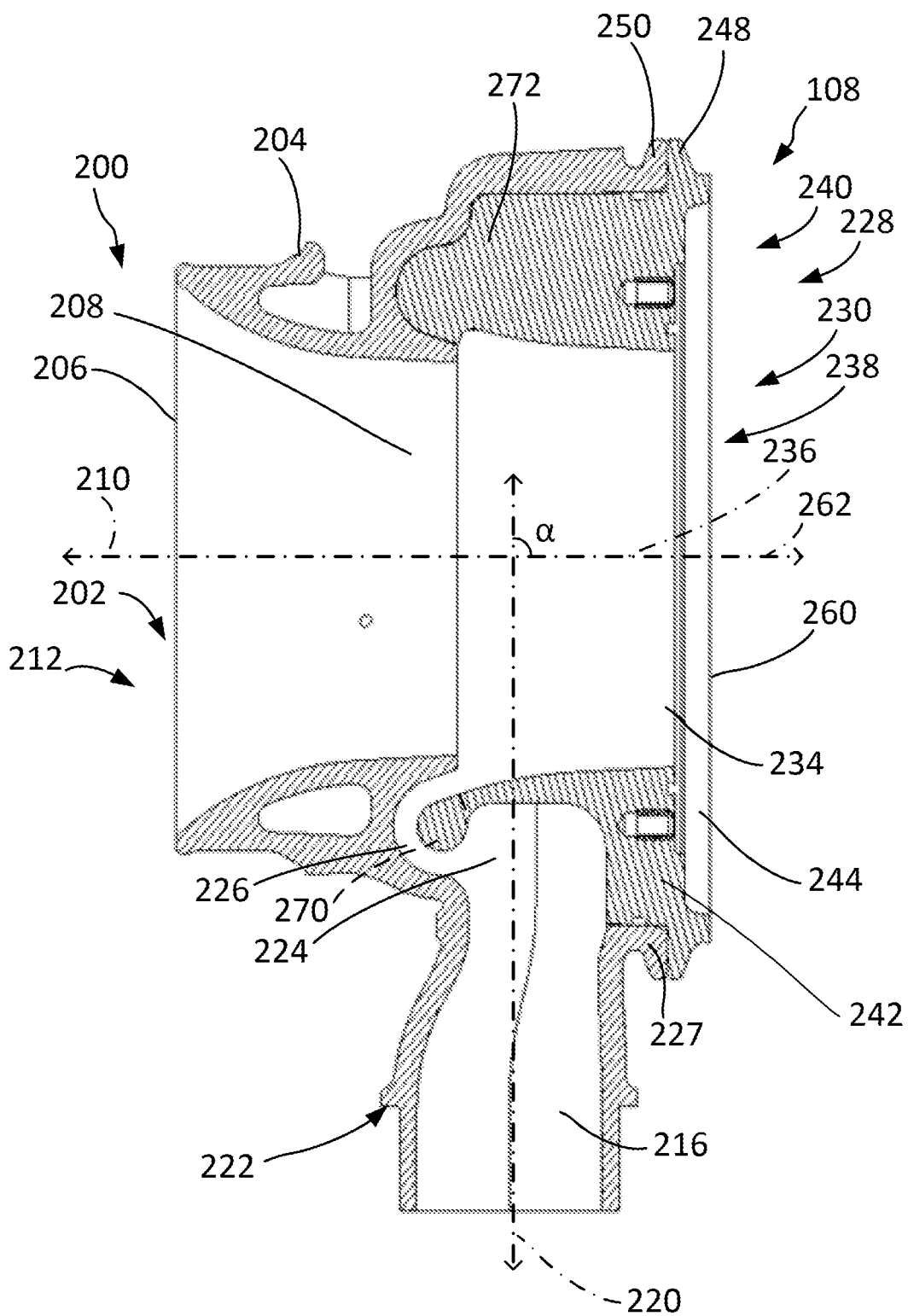
FIG. 7 is a cross-sectional view of the gaseous fuel-air mixer of FIG. 6 taken along plane C-C.

FIGS. 6 and 7 depict the gaseous fuel-air mixer 108 in an embodiment where each of the fuel chamber ribs 272 is integrally formed with the inner shell 228, rather than being integrally formed with the outer shell 200, as shown in FIGS. 2-5. In these embodiments, each of the fuel chamber ribs 272 may be integrally formed with the inner shell intake body 238 and the inner shell dividing wall 242.

Each of the fuel chamber ribs 272 is in confronting relation with the fuel intake collecting wall 224 and the fuel intake concentrating wall 226 when the outer shell 200 is coupled to the inner shell 228. This arrangement is facilitated in part by each of the fuel chamber ribs 272 extending at least partially along the lobe 270, as shown in FIG. 6.

In some embodiments, the outer shell 200 includes the at least one slot 274. For example, each of the slots 274 may be formed in at least one of the fuel intake collecting wall 224 or the fuel intake concentrating wall 226. As described herein, each of the slots 274 receives one of the fuel chamber ribs 272 when the outer shell 200 is coupled to the inner shell 228.

Figure 8:
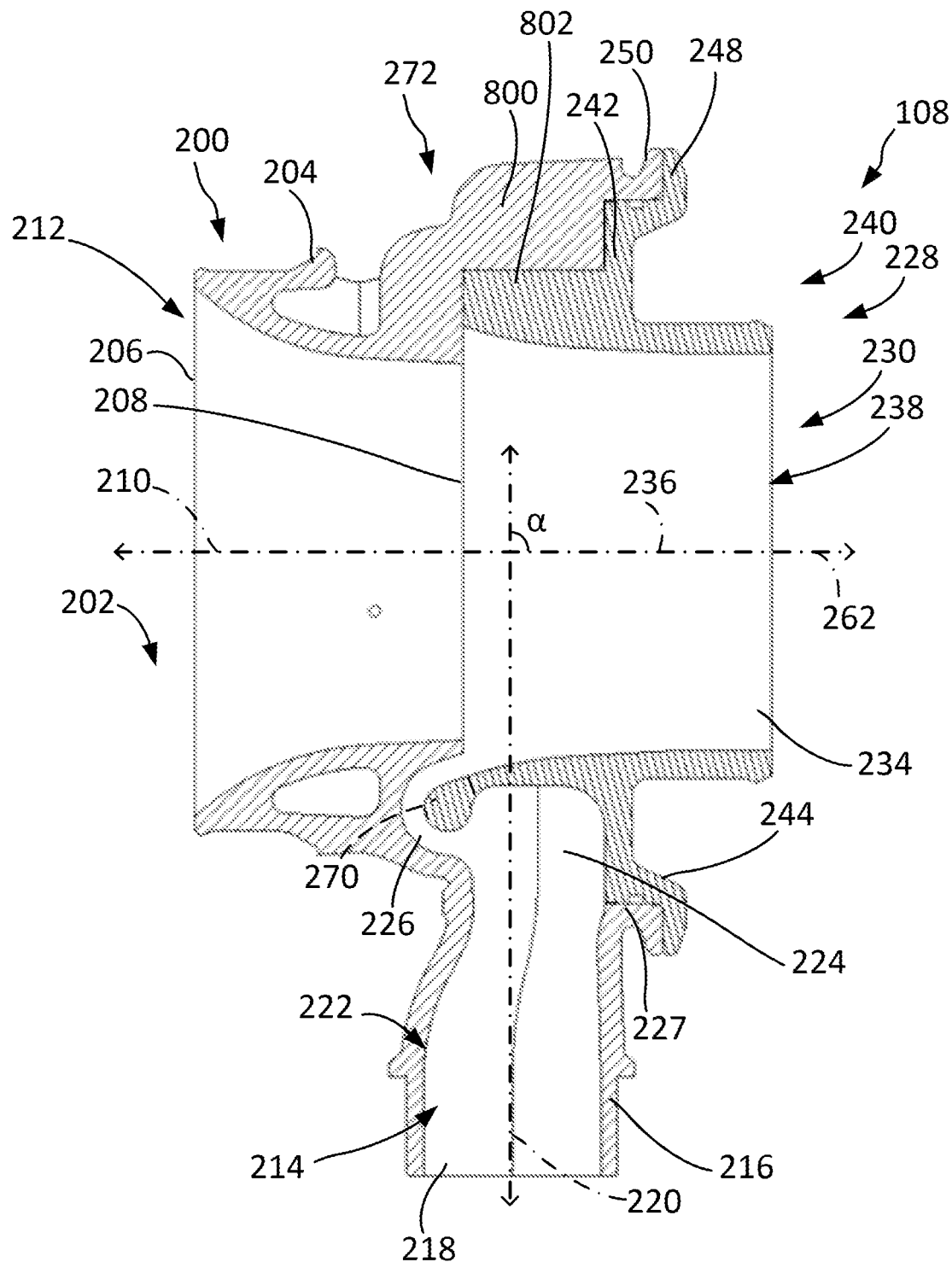
FIG. 8 is a cross-sectional view of yet another example gaseous fuel-air mixer.

FIG. 8 depicts the gaseous fuel-air mixer 108 in an embodiment where each of the fuel chamber ribs 272 includes an outer shell rib 800 and an inner shell rib 802. Each of the outer shell ribs 800 is integrally formed with the outer shell 200 and each of the inner shell ribs 802 is integrally formed with the inner shell 228. Each of the outer shell ribs 800 is integrally formed with the fuel intake collecting wall 224 and/or the fuel intake concentrating wall 226. Each of the inner shell ribs 802 is integrally formed with the inner shell intake body 238. For example, each of the inner shell ribs 802 may be integrally formed with the lobe 270.

When the outer shell 200 is coupled to the inner shell 228, each of the outer shell ribs 800 is aligned with one of the inner shell ribs 802 and cooperates with the inner shell rib 802 to function as one of the fuel chamber ribs 272 as described herein. For example, each of the outer shell ribs 800 may interface with one of the inner shell ribs 802 when the outer shell 200 is coupled to the inner shell 228 such that a substantially fluid tight seal (e.g., permitting less than 5% of mass fuel flow, etc.) is formed between the outer shell rib 800 and the inner shell rib 802.

Figure 9:
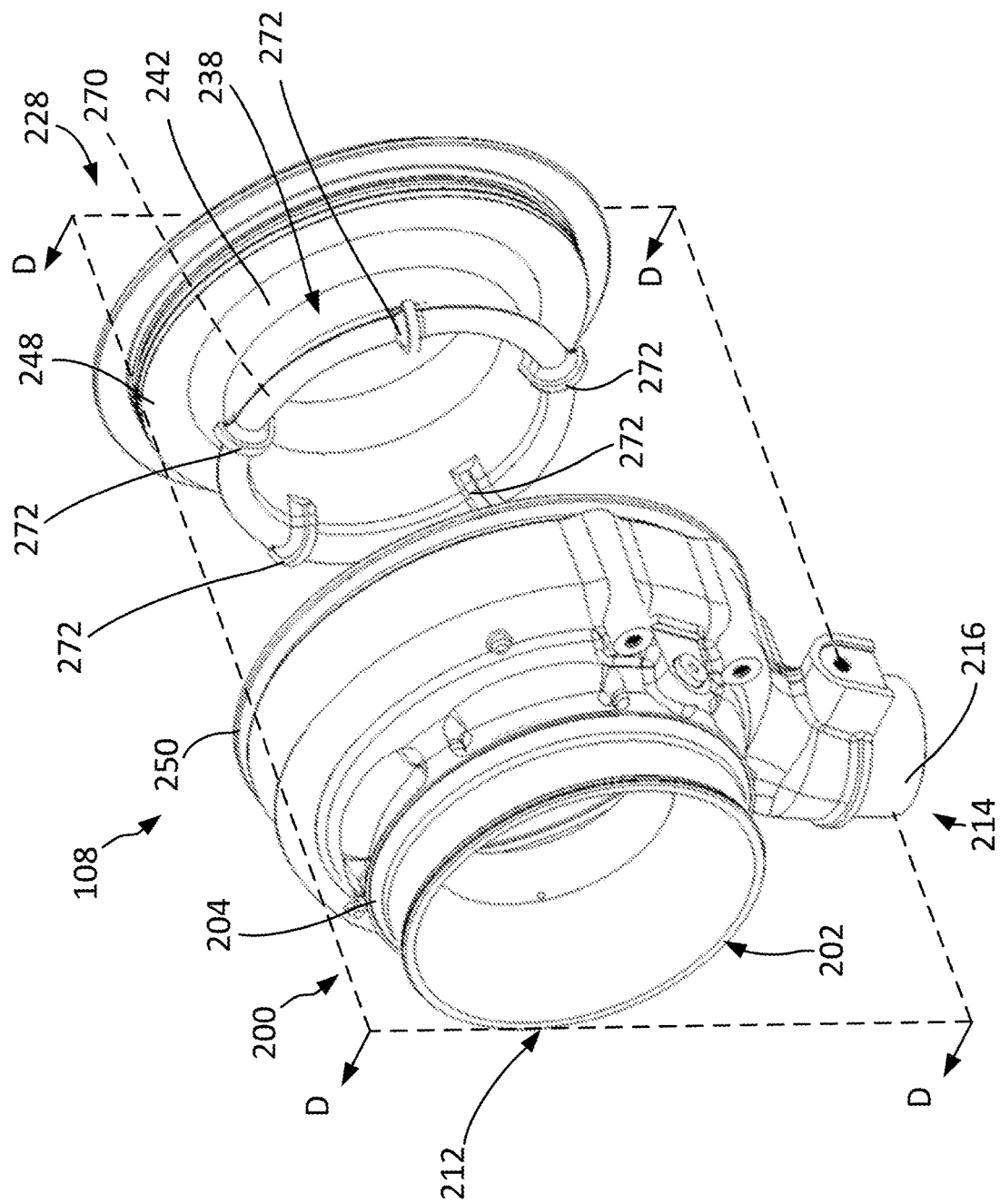
FIG. 9 is a perspective view of yet another example gaseous fuel-air mixer.
Figure 10:
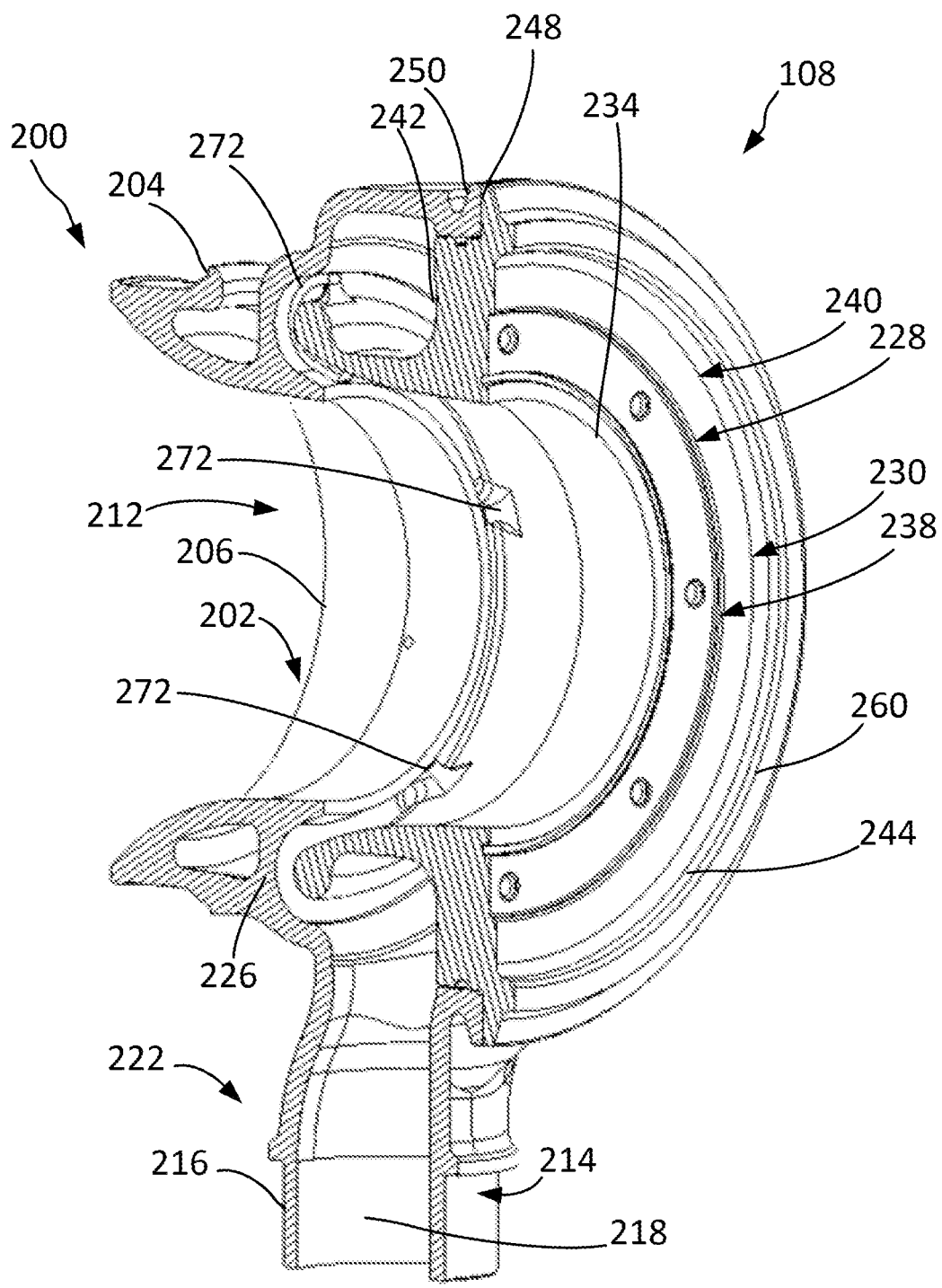
FIG. 10 is a cross-sectional view of the gaseous fuel-air mixer of FIG. 9 taken along plane D-D.
Figure 11:
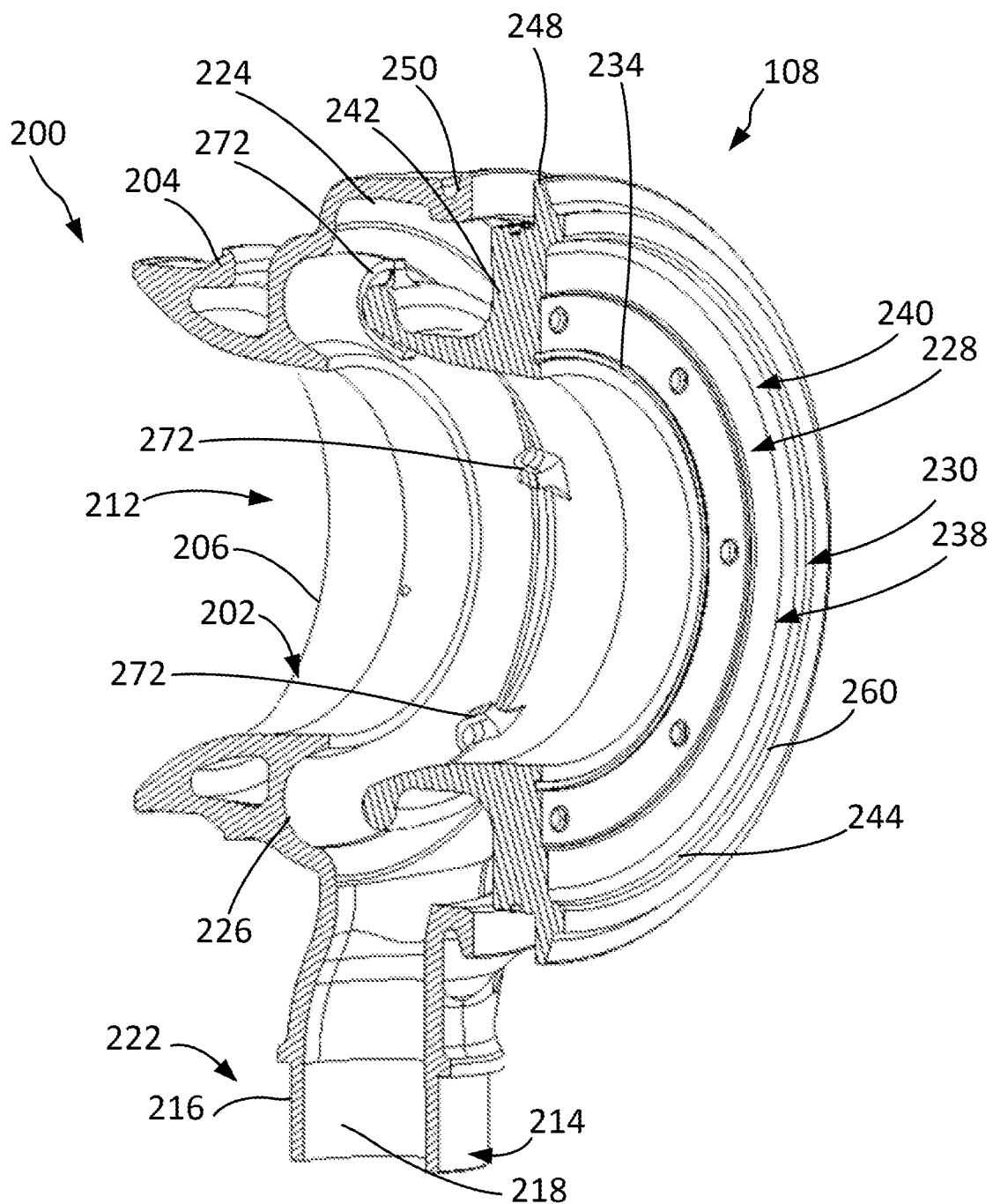
FIG. 11 is an exploded view of the cross-sectional view shown in FIG. 10.

FIGS. 9-11 depict the gaseous fuel-air mixer 108 in an embodiment where each of the fuel chamber ribs 272 is integrally formed with only the inner shell intake body 238. Each of the fuel chamber ribs 272 is in confronting relation with the fuel intake concentrating wall 226 when the outer shell 200 is coupled to the inner shell 228. In various embodiments, each of the fuel chamber ribs 272 is not in confronting relation with the fuel intake collecting wall 224 when the outer shell 200 is coupled to the inner shell 228. This arrangement is facilitated in part by the each of the fuel chamber ribs 272 extending at least partially along the lobe 270, as shown in FIG. 11.

The gaseous fuel-air mixer 108 shown in FIGS. 9-11 includes five fuel chamber ribs 272. In some embodiments, the five fuel chamber ribs 272 are each angularly separated from adjacent fuel chamber ribs 272 by approximately 72°. In this way, fuel flow may be equally divided between the five passages formed between adjacent pairs of the fuel chamber ribs 272, thereby reducing swirl imparted by the fuel on the gaseous fuel-air mixture.

Figure 12:
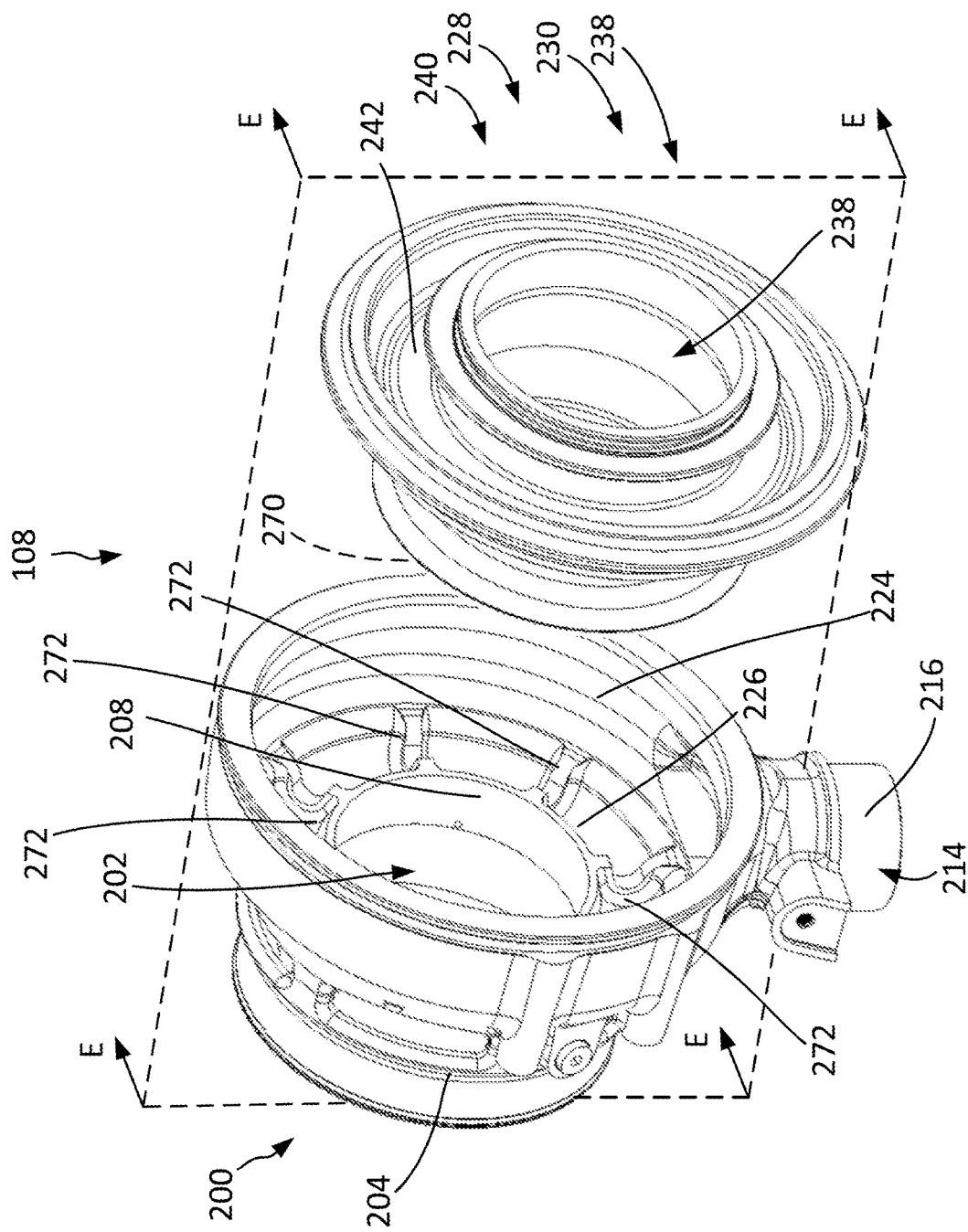
FIG. 12 is a perspective view of yet another example gaseous fuel-air mixer.
Figure 13:
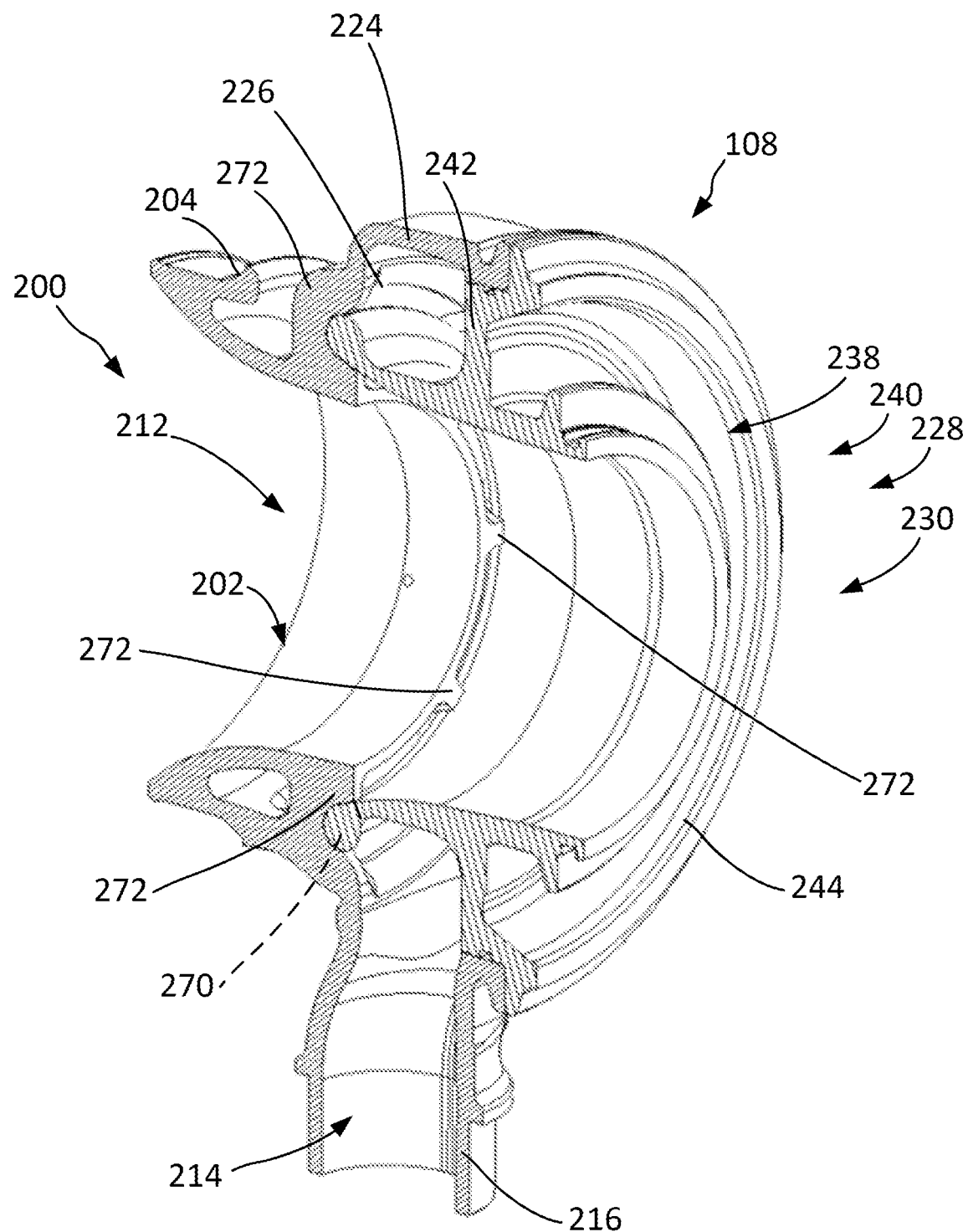
FIG. 13 is a cross-sectional view of the gaseous fuel-air mixer of FIG. 12 taken along plane E-E.

FIGS. 12 and 13 depict the gaseous fuel-air mixer 108 in an embodiment each of the fuel chamber ribs 272 is integrally formed with only the fuel intake concentrating wall 226. Each of the fuel chamber ribs 272 is in confronting relation with the lobe 270 when the outer shell 200 is coupled to the inner shell 228. In various embodiments, each of the fuel chamber ribs 272 is separated from the fuel intake collecting wall 224 such that flow of the fuel between the fuel intake collecting wall 224 and the inner shell intake body 238 is not impeded by the at least one fuel chamber rib 272.

The gaseous fuel-air mixer 108 shown in FIGS. 12 and 13 includes seven fuel chamber ribs 272. In some embodiments, the seven fuel chamber ribs 272 are each angularly separated from adjacent fuel chamber ribs 272 by approximately 51°. In this way, fuel flow may be equally divided between the seven passages formed between adjacent pairs of the fuel chamber ribs 272, thereby reducing swirl imparted by the fuel on the gaseous fuel-air mixture.

IV. Manufacturing of the Gaseous Fuel-Air Mixer

In various embodiments, various components of the gaseous fuel-air mixer 108 (e.g., the outer shell 200, the inner shell 228, etc.) are assembled via additive manufacturing. For example, the gaseous fuel-air mixer 108 may be assembled using 3D printing, selective laser sintering, or other similar processes. In these embodiments, the gaseous fuel-air mixer 108 is configured such that several components of the gaseous fuel-air mixer 108 are integrally formed, in various embodiments. The components of the gaseous fuel-air mixer 108 may be "integrally formed" when the components of the gaseous fuel-air mixer 108 are formed and joined together as part of a single manufacturing step. The components of the gaseous fuel-air mixer 108 may also be "integrally formed" when the components of the gaseous fuel-air mixer 108 are formed and joined together using several manufacturing steps (e.g., machining and subsequent welding, machining and subsequent chemical bending, etc.).

When two components are "integrally formed," the two components create a single-piece or unitary construction that cannot be disassembled without an at least partial destruction of either or both of the two components. For example, when the components of the gaseous fuel-air mixer 108 are integrally formed, the components of the gaseous fuel-air mixer 108 are: (i) not separable from each other (e.g., one component of the gaseous fuel-air mixer 108 cannot be separated from the gaseous fuel-air mixer 108 without destroying the gaseous fuel-air mixer 108, etc.); (ii) not formed separately from each other (e.g., the components of the gaseous fuel-air mixer 108 are formed simultaneously, the components of the gaseous fuel-air mixer 108 are formed as a single component in a single process, etc.); and (iii) there are no gaps or joints along borders between contiguous components of the gaseous fuel-air mixer 108 (e.g., components that share a border, etc.). In some embodiments, the gaseous fuel-air mixer 108 is constructed entirely of stainless steel (e.g., stainless steel 316, etc.). In other embodiments, the gaseous fuel-air mixer 108 is constructed entirely of aluminum or steel.

In embodiments where a component of the gaseous fuel-air mixer 108 is integrally formed, the component does not have any internal joints (e.g., between portions of the component, etc.) that create leakage paths for the air and/or the fuel. As a result, the air and the fuel cannot leak from the component of the gaseous fuel-air mixer 108. This may decrease warranty costs associated with the internal combustion engine system 100 compared to other mixers which have a plurality of internal joints that create leakage paths. These leakage paths can cause leakage of the air and/or the fuel over time, thereby making these other systems undesirable.

Furthermore, in embodiments where a component of the gaseous fuel-air mixer 108 is integrally formed, the part-count (e.g., number of items in a bill of materials, number of stocked items, etc.) for the component of the gaseous fuel-air mixer 108 is lower than for other conventional mixers because the component is integrally formed.

Each of the fuel chamber ribs 272, the lobe 270, and the fuel intake concentrating wall 226, among other components of the gaseous fuel-air mixer 108, can be configured to each have a target geometry when assembled via additive manufacturing. For example, one fuel chamber rib 272 may have a first cross-sectional shape (e.g., air foil, teardrop, etc.) and another fuel chamber rib 272 may have a second cross-sectional shape (e.g., square, triangular, circular, elliptical, etc.) that is different from the first cross-sectional shape. By selecting appropriate cross-sectional shapes for each component of the gaseous fuel-air mixer 108 in accordance with predetermined design and/or performance parameters, a target swirl of the gaseous fuel-air mixture and/or pressure drop of the gaseous fuel-air mixer 108 may be attained. Still further, a mass of the gaseous fuel-air mixer 108 may be significantly less than a mass of a convention mixer when a component of the gaseous fuel-air mixer 108 is integrally formed because masses of fasteners (e.g., bolts, etc.) and increased material thicknesses to accommodate use of fasteners, as utilized in conventional mixers, are eliminated.

V. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, or with the two components, or with the two components and any additional intermediate components being attached to one another.

The terms "fluidly coupled to" and the like, as used herein, mean the two components or objects have a pathway formed between the two components or objects in which a fluid, such as air, fuel, a gaseous fuel-air mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A gaseous fuel-air mixer comprising:
an outer shell comprising:
an air intake that defines an air intake center axis and is configured to receive air, the air intake having an air outlet, and
a fuel intake having a fuel inlet centered on a fuel intake center axis that is configured to receive fuel;
an inner shell comprising an inner shell intake that is configured to separately receive the air from the air outlet and the fuel from the fuel intake and to provide a gaseous fuel-air mixture, the inner shell cooperating with the outer shell to define a fuel intake collecting chamber that is configured to receive the fuel from the fuel inlet and a fuel intake concentrating chamber that is configured to receive the fuel from the fuel intake collecting chamber and provide the fuel to the inner shell intake; and
a fuel chamber rib that is coupled to at least one of the outer shell or the inner shell, the fuel chamber rib disposed along the fuel intake center axis within at least one of the fuel intake collecting chamber or the fuel intake concentrating chamber,
wherein the fuel chamber rib extends in a direction parallel to the air intake center axis defining a first passage and a second passage of at least one of the fuel intake collecting chamber or the fuel intake concentrating chamber.

2. The gaseous fuel-air mixer of claim 1, wherein:
the inner shell intake is centered on a center axis;
the fuel intake collecting chamber extends annularly about the center axis; and the fuel chamber rib extends within the fuel intake collecting chamber so as to prevent flow of fuel between the outer shell and the inner shell within the fuel intake collecting chamber.

3. The gaseous fuel-air mixer of claim 2, wherein:
the fuel intake concentrating chamber extends annularly about the center axis; and
the fuel chamber rib extends within the fuel intake concentrating chamber so as to prevent flow of fuel between the outer shell and the inner shell within the fuel intake concentrating chamber.

4. The gaseous fuel-air mixer of claim 1, wherein the outer shell and the inner shell are integrally formed.

5. The gaseous fuel-air mixer of claim 4, wherein the fuel chamber rib is integrally formed with the outer shell and the inner shell.

6. The gaseous fuel-air mixer of claim 1, wherein the fuel chamber rib is integrally formed with the outer shell.

7. The gaseous fuel-air mixer of claim 1, wherein the fuel chamber rib is integrally formed with the inner shell.

8. A gaseous fuel-air mixer comprising:
an outer shell comprising:
an air intake defining an air intake center axis and is configured to receive air, the air intake having an air outlet, and
a fuel intake having a fuel inlet centered on a fuel intake center axis that is configured to receive fuel;
an inner shell comprising an inner shell intake configured to separately receive the air from the air outlet and the fuel from the fuel intake and to provide a gaseous fuel-air mixture, the inner shell cooperating with the outer shell to define a fuel intake collecting chamber configured to receive the fuel from the fuel inlet and a fuel intake concentrating chamber configured to receive the fuel from the fuel intake collecting chamber and provide the fuel to the inner shell intake; and
a fuel chamber rib that is coupled to the outer shell, the fuel chamber rib disposed along the fuel intake center axis within the fuel intake collecting chamber and the fuel intake concentrating chamber, the fuel chamber rib in confronting relation with a portion of the inner shell,
wherein the fuel chamber rib extends in a direction parallel to the air intake center axis defining a first passage and a second passage of at least one of the fuel intake collecting chamber or the fuel intake concentrating chamber.

9. The gaseous fuel-air mixer of claim 8, wherein:
the inner shell intake is centered on a center axis;
the fuel intake collecting chamber extends annularly about the center axis; and
the fuel chamber rib extends within the fuel intake collecting chamber so as to prevent flow of fuel between the outer shell and the inner shell within the fuel intake collecting chamber.

10. The gaseous fuel-air mixer of claim 9, wherein:
the fuel intake concentrating chamber extends annularly about the center axis; and
the fuel chamber rib extends within the fuel intake concentrating chamber so as to prevent flow of fuel between the outer shell and the inner shell within the fuel intake concentrating chamber.

11. The gaseous fuel-air mixer of claim 8, wherein the fuel chamber rib is integrally formed with the outer shell.

12. The gaseous fuel-air mixer of claim 8, wherein:
the inner shell further comprises an inner shell intake body having a slot; and
the fuel chamber rib is positioned within the slot.

13. The gaseous fuel-air mixer of claim 8, wherein:
the inner shell comprises an inner shell intake body; and
a portion of the air outlet is disposed within a portion of the inner shell intake body.

14. A gaseous fuel-air mixer comprising:
an outer shell comprising:
an air intake defining an air intake center axis and is configured to receive air, the air intake having an air outlet, and
a fuel intake having a fuel inlet configured to receive fuel centered on a fuel intake center axis that is;
an inner shell comprising an inner shell intake configured to separately receive the air from the air outlet and the fuel from the fuel intake and to provide a gaseous fuel-air mixture, the inner shell cooperating with the outer shell to define a fuel intake collecting chamber configured to receive the fuel from the fuel inlet and a fuel intake concentrating chamber configured to receive the fuel from the fuel intake collecting chamber and provide the fuel to the inner shell intake; and
a fuel chamber rib that is coupled to the inner shell, the fuel chamber rib disposed along the fuel intake center axis within the fuel intake concentrating chamber, the fuel chamber rib in confronting relation with a portion of the outer shell,
wherein the fuel chamber rib extends in a direction parallel to the air intake center axis defining a first passage and a second passage of at least one of the fuel intake collecting chamber or the fuel intake concentrating chamber.

15. The gaseous fuel-air mixer of claim 14, wherein:
the inner shell intake is centered on a center axis;
the fuel intake concentrating chamber extends annularly about the center axis; and
the fuel chamber rib extends within the fuel intake concentrating chamber so as to prevent flow of fuel between the outer shell and the inner shell within the fuel intake concentrating chamber.

16. The gaseous fuel-air mixer of claim 14, wherein the fuel chamber rib is integrally formed with the inner shell.

17. The gaseous fuel-air mixer of claim 14, wherein:
the inner shell comprises an inner shell intake body; and
a portion of the air outlet is disposed within a portion of the inner shell intake body.

18. The gaseous fuel-air mixer of claim 14, wherein:
the air outlet is centered on the air intake center axis; and
the fuel intake center axis intersects the air intake center axis.

* * * * *